(12) United States Patent
Wei et al.

(10) Patent No.: US 12,504,506 B2
(45) Date of Patent: Dec. 23, 2025

(54) HARMONIC RADAR BASED ON FIELD PROGRAMMABLE GATE ARRAY (FPGA) AND DEEP LEARNING

(71) Applicant: Beihang University, Beijing (CN)

(72) Inventors: Shaoming Wei, Beijing (CN); Song Yang, Beijing (CN); Jun Wang, Beijing (CN); Likang Zhu, Beijing (CN)

(73) Assignee: Beihang University, Beijing (CN)

( * ) Notice: Subject to any disclaimer, the term of this patent is extended or adjusted under 35 U.S.C. 154(b) by 315 days.

(21) Appl. No.: 18/118,942

(22) Filed: Mar. 8, 2023

(65) Prior Publication Data
US 2023/0358856 A1     Nov. 9, 2023

(30) Foreign Application Priority Data
Mar. 9, 2022   (CN) .......................... 202210225000.6

(51) Int. Cl.
G01S 7/282      (2006.01)
G01S 7/292      (2006.01)
G01S 7/41       (2006.01)

(52) U.S. Cl.
CPC ............. G01S 7/282 (2013.01); G01S 7/292 (2013.01); G01S 7/417 (2013.01)

(58) Field of Classification Search
CPC .......... G01S 7/282; G01S 7/292; G01S 7/417
See application file for complete search history.

(56) References Cited

U.S. PATENT DOCUMENTS

| 9,395,434 B2* | 7/2016 | Mazzaro | G01S 7/02 |
| 2018/0136326 A1* | 5/2018 | Schuck | G01S 13/583 |
| 2022/0047209 A1* | 2/2022 | Shin | G06V 10/778 |

* cited by examiner

Primary Examiner — Bernarr E Gregory
Assistant Examiner — Nazra Nur Waheed
(74) Attorney, Agent, or Firm — Banner & Witcoff, Ltd.

(57) ABSTRACT

The present disclosure relates to radar signal processing, and a harmonic radar based on a field programmable gate array (FPGA) and deep learning. Specifically, a signal processing module generates a baseband linear frequency modulation (LFM) signal, converts the baseband LFM signal into an analog signal, and mixes the analog signal with a local carrier frequency signal to obtain a radio frequency (RF) transmitting signal. A second-harmonic signal/a third-harmonic signal is generated after the RF transmitting signal irradiates a target, and is transmitted to a second-harmonic receiver/a third-harmonic receiver correspondingly; after undergoing low-noise amplification and filtering by the corresponding harmonic receiver, the second-harmonic signal/the third-harmonic signal and a corresponding local oscillator signal are demodulated to obtain an echo baseband signal; and the echo baseband signal is amplified and sent to a signal processing module for processing after being quantified and converted by an analog-to-digital converter (ADC).

10 Claims, 22 Drawing Sheets

FIG. 22

HARMONIC RADAR BASED ON FIELD PROGRAMMABLE GATE ARRAY (FPGA) AND DEEP LEARNING

CROSS REFERENCE TO RELATED APPLICATION(S)

This patent application claims the benefit and priority of Chinese Patent Application No. 202210225000.6, filed with the China National Intellectual Property Administration on Mar. 9, 2022, the disclosure of which is incorporated by reference herein in its entirety as part of the present application.

TECHNICAL FIELD

The present disclosure relates to the field of radar signal processing, and specifically, to a harmonic radar based on a field programmable gate array (FPGA) and deep learning.

BACKGROUND

Radar targets can be classified into linear targets and nonlinear targets based on properties of the radar targets. The linear target does not generate a new frequency component after being irradiated and scattered by an electromagnetic wave emitted by a radar. In addition to scattering a fundamental component of a radar signal, the nonlinear target also radiates a higher-harmonic component externally. A harmonic radar is a radar that receives and processes a harmonic component signal radiated by a target.

As a new research direction of machine learning, deep learning is widely used in face identification, pedestrian detection, image analysis and other fields by building an artificial neural network (ANN) and extracting mode features through multi-level analysis and calculation, but there is no relevant application method in target identification of the harmonic radar.

As a programmable logic device, an FPGA has advantages of high integration, high reliability, flexibility, convenience, a fast speed, and a small size. The FPGA has high processing performance in the field of parallel computing, and is often used in the field of digital signal processing. In addition, the FPGA matches a characteristic of parallel operation of a neural network, which can shorten network training time and realize real-time processing.

The harmonic radar detects the target based on a nonlinear characteristic of the target, and its implementation scheme is different from that of a conventional radar. At present, the harmonic radar has following problems in application and implementation.

1. The harmonic radar has a high requirement for a linearity of a transmitting channel. The transmitting channel couples a harmonic signal generated by a device nonlinearly to a receiving channel. Usually, this signal is far greater than a harmonic radiation generated by the target.
2. Because a harmonic signal re-radiated by the target is weak, a receiver design requires high sensitivity and a large processing gain.
3. At present, the harmonic radar can only identify whether the target belongs to a semiconductor or a metallic contact, in other words, implement simple binary classification, and is difficult to identify more detailed types.

To sum up, the harmonic radar has some problems such as few types of identifiable targets, impacts from human experience, high identification difficulty, and low identification accuracy.

SUMMARY

In order to resolve the above problems in the prior art, the present disclosure provides a harmonic radar based on an FPGA and deep learning, to increase identified target types and improve identification accuracy.

The harmonic radar based on an FPGA and deep learning includes: a signal processing module, a radio frequency (RF) transmitter, a transceiver antenna, a second-harmonic receiver, a third-harmonic receiver, an RF power supply, a user display module, and a target identification module, where the signal processing module is connected to the RF transmitter by using a pin structure, and the RF transmitter is connected to the transceiver antenna by using an RF cable structure; and the signal processing module is separately connected to the second-harmonic receiver, the third-harmonic receiver, the user display module, and the target identification module by using the RF cable structure;

as a core of the signal processing module, an FPGA generates a baseband linear frequency modulation (LFM) signal in a transmitting direction, converts the baseband LFM signal into an analog signal by using a digital-to-analog converter (DAC) of the RF transmitter, mixes the analog signal with a local carrier frequency signal to obtain an RF transmitting signal through modulation, filters a high-frequency component and an interference signal from the RF transmitting signal by using a filter, sends the RF transmitting signal to a power amplifier to adjust transmitting power, filters a leaked high-frequency component by using the filter, and finally transmits the RF transmitting signal by using the transceiver antenna;

a second-harmonic signal and a third-harmonic signal are generated after the RF transmitting signal irradiates a target, and are transmitted to the second-harmonic receiver and the third-harmonic receiver respectively; after undergoing low-noise amplification and filtering by the corresponding harmonic receiver, the second-harmonic signal and a corresponding local oscillator signal are demodulated by an I/Q demodulator to obtain an echo baseband signal, and the third-harmonic signal and a corresponding local oscillator signal are demodulated by the I/Q demodulator to obtain an echo baseband signal; and then the echo baseband signal is amplified by an intermediate frequency (IF) amplifier and converted into a differential form, and then sent to the signal processing module for processing and analysis after being quantified and converted by an analog-to-digital converter (ADC); and the signal processing module performs pulse compression, pulse accumulation, and identification and detection on signals input by the second-harmonic receiver and the third-harmonic receiver, and inputs processed signals to the user display module for spectrum display; and converts another signal into an audio signal, inputs the audio signal to the target identification module for identification and classification, and displays an identification result.

Further, the signal processing module further includes a clock source, a fan-out device, a differential amplification circuit, an audio codec module, a network interface module, and a power module.

A hardware circuit of the FPGA includes the FPGA, a Flash configuration circuit, a clock/reset circuit, a user interface, and the like, where the user interface includes a DAC bus, an ADC bus, a screen, a key, and the like. The FPGA is responsible for timing control, data access, and user interactive display of a peripheral device, baseband transmitting signal generation, and pulse compression, pulse accumulation, and identification and detection of the echo baseband signal.

The RF transmitter includes a local oscillator, an I/Q modulator, the power amplifier, and a cascaded filtering circuit.

The local oscillator generates the carrier frequency signal, the I/Q modulator modulates the LFM signal and the carrier frequency signal to obtain the RF transmitting signal; and the RF transmitting signal is sent to the power amplifier to adjust the transmitting power after the high-frequency component leaked between channels and the interference signal generated by a device nonlinearly are filtered from the RF transmitting signal by using a band-pass filter, and finally radiated by a transmitting antenna after the leaked high-frequency component is further filtered by the cascaded filtering circuit.

The transceiver antenna is configured to transmit a wireless signal and receive second and third harmonics of the target, and specifically includes a broadband spiral antenna, a four-port broadband circulator for harmonic suppression, and a miniaturized band-pass filter for suppressing a higher harmonic.

The second-harmonic receiver/the third-harmonic receiver includes an RF amplification circuit and a demodulation circuit; and the second-harmonic signal/the third-harmonic signal radiated by a nonlinear target and received by the antenna is amplified, the echo baseband signal is obtained by demodulating an amplified echo and the local oscillator signal by the I/Q demodulator, the echo baseband signal is amplified by using the IF amplifier, and the amplified echo baseband signal is sent to a signal processing unit for processing and analysis after being converted by the ADC.

The target identification module includes a data collection terminal, a data pre-processing module, an ANN model, an artificial interaction module, and an encapsulation module. A deep learning technology is used to build an ANN, and an accumulation method based on a frequency-domain feature is used to learn a feature of an audio signal database collected by the harmonic radar, generate a classification model, establish an artificial intelligent classification system, and complete classification and identification of a harmonic radar target.

The harmonic radar can detect and identify a plurality of targets of different types such as a semiconductor, a metallic contact, a wall-mounted switch, wall-mounted socket, a network port, a mouse, an integrated circuit board, a lithium battery, a power adapter, a professional recording device, a secure digital (SD) storage card, and a micro microphone.

The data collection terminal is connected to output ports of the second-harmonic receiver and the third-harmonic receiver; the data pre-processing module performs batch processing, clipping, and alignment operations on training set data and test set data; the ANN model is responsible for extracting a feature from the training set data, performing deep learning and training, and completing model encapsulation under an optimal parameter configuration; and the artificial interaction module is responsible for displaying an atlas feature of to-be-identified data, calling the encapsulated model, performing feature identification, completing target classification, and finally displaying an obtained target classification and identification result.

The baseband LFM signal $s_{LMF\_train}(t)$ is expressed as follows:

$$s_{LMF\_train}(t) = A \cdot \sum_{i=0}^{N-1} rect\left(\frac{t_i}{T_p}\right) e^{j2\pi(f_c t_i + \gamma t_i^2/2)}$$

$$iT - \frac{T_p}{2} \le t_i \le iT + \frac{T_p}{2}$$

where A represents a pulse amplitude, N represents a quantity of pulses in a single group, rect(·) represents a rectangular pulse, $$rect(u) = \begin{cases} 1, & |u| \le 1/2 \\ 0, & \text{others} \end{cases},$$

$t_i$ represents fast time, $T_p$ represents a pulse width, $f_c$ represents a radar center frequency, and $\gamma = B/T_p$ represents a frequency modulation (FM) slope of the LFM signal, where B represents a sweep bandwidth of the LFM signal, and T represents a pulse repetition interval.

The echo baseband signal $s_r(t)$ is expressed as follows:

$$s_r(t) = s_t\left(t - \frac{2R_t}{c}\right)$$

where $R_t$ represents a distance of a single scattering point target relative to a radar, c represents a light speed, and $s_t(t)$ represents a transmitting signal formed by a coherent pulse train, which is expressed as follows:

$$s_t(t) = \sum_{n=0}^{N-1} s_{LMF\_train}(t - nT_r)$$

where $T_r$ represents a pulse repetition cycle;

The differential form of the converted echo baseband signal is as follows:

$$s_{r-}(t) = k_{11} s_r(t) + k_{12} s_{ref}$$

$$s_{r+}(t) = k_{11} s_{r-}(t) + k_{22} s_{ref}$$

where $k_{11}$, $k_{12}$, $k_{21}$, and $k_{22}$ represent fixed conversion coefficients, and $s_{ref}$ represents a fixed reference signal.

A two-dimensional signal $s_{accum}(\hat{t}, f_k)$ in a range-doppler domain displayed in an output spectrum is expressed as follows:

$$S_{accum}(\hat{t}, k) = \sum_{n=0}^{N-1} \exp\left[j(\omega_d T_r - \frac{2\pi}{N}k)n\right]$$

$$= \frac{\sin\left[N\pi(f_d - \frac{k}{NT_r})T_r\right]}{\sin\left[\pi(f_d - \frac{k}{NT_r})T_r\right]} \exp\left[j\pi(N-1)(f_d - \frac{k}{NT_r})T_r\right],$$

$$k = 0, 1, \ldots, N-1$$

where $\hat{t}$ represents fast time, indicating time within each pulse relative to start time of a synchronization cycle of the pulse; and $\omega_d=2\pi f_d$ represents a Doppler frequency caused by motion of the target.

It is set that $$f_k = \frac{k}{NT_r},$$

which is substituted into the above formula to obtain an amplitude-frequency response of an accumulated signal in a Doppler domain:

$$|S_{accum}(\hat{t}, f_k)| = \left|\frac{\sin[N\pi(f_k - f_d)T_r]}{\sin[\pi(f_k - f_d)T_r]}\right|$$

The audio conversion includes amplitude modulation (AM) audio conversion and FM audio conversion, specifically:

1) a process of converting harmonic power $Y_{HR2}(t)$ obtained by sketching the second harmonic into an AM audio signal is as follows:
setting a sinusoidal carrier of the AM audio signal of the second harmonic as follows:

$$c_2(t)=A_2 \cos(\omega_{c2}t+\phi_0)$$

where $A_2$ represents a carrier amplitude of the second harmonic; $\omega_{c2}$ represents a carrier angular frequency of the second harmonic; and $\phi_0$ represents an initial phase of the carrier (it is generally assumed that $\phi_0=0$); and
expressing, based on a definition of modulation, an AM signal of the second harmonic as follows:

$$s_{AM\,2}(t)=A_2Y_{HR2}(t)\cos(\omega_{c2}t)$$

2) a process of converting harmonic power $Y_{HR3}(t)$ obtained by sketching the third harmonic into an AM audio signal is as follows:
setting a sinusoidal carrier of the AM audio signal of the third harmonic as follows:

$$c_2(t)=A_2 \cos(\omega_{c2}t+\phi_0)$$

where $A_3$ represents a carrier amplitude of the third harmonic; and $\omega_{c3}$ represents a carrier angular frequency of the third harmonic; and
expressing, based on the definition of modulation, an AM signal of the third harmonic as follows:

$$c_3(t)=A_3 \cos(\omega_{c3}t+\phi_0)$$

3) a process of converting the harmonic power $Y_{HR2}(t)$ obtained by sketching the second harmonic into an FM audio signal is as follows:
setting a sinusoidal carrier of the FM audio signal of the second harmonic as follows:

$$c_3(t)=A_3 \cos(\omega_{c3}t+\phi_0)$$

where $f_{c2}$ represents the carrier frequency of the second harmonic; and
expressing an FM signal of the second harmonic as follows:

$$s_{FM2}(t)=A_2 \cos[2\pi f_{c2}t+K_{f2}\int Y_{HR2}(\tau)d\tau]$$

where $K_{f2}$ represents FM sensitivity of the second harmonic; and 4) a process of converting the harmonic power $Y_{HR3}(t)$ obtained by sketching the third harmonic into an FM audio signal is as follows:
setting a sinusoidal carrier of the FM audio signal of the third harmonic as follows:

$$c_3(t)=A_3 \cos(2\pi f_{c3}t)$$

where $f_{c3}$ represents a carrier frequency of the third harmonic; and
expressing an FM signal of the third harmonic as follows:

$$s_{FM3}(t)=A_3 \cos[2\pi f_{c3}t+K_{f3}\int Y_{HR3}(\tau)d\tau]$$

where $K_{f3}$ represents FM sensitivity.

The audio signal is identified and classified by accumulating an audio data feature collected by the harmonic radar based on a frequency dimension of a spectrogram, and then sending an accumulated new feature to a convolutional neural network (CNN) for deep learning.

The present disclosure has following advantages.

1) According to the harmonic radar based on an FPGA and deep learning, the RF transmitter uses the band-pass filter and a programmable power amplifier, which effectively filters the high-frequency component between the channels and the device interference signal, ensures a high linearity of the transmitting signal, and achieves a good harmonic suppression effect.

2) According to the harmonic radar based on an FPGA and deep learning, in order to improve a limit value of receiver sensitivity of the harmonic radar, the present disclosure uses a pulse compression method, a pulse accumulation method, and the like from a perspective of digital signal processing, thereby further improving an echo signal-to-noise ratio and a target signal detection probability.

3) According to the harmonic radar based on an FPGA and deep learning, in order to resolve a problem that a digital signal processing algorithm involves a large amount of data operation and parallel processing, the present disclosure uses the FPGA as a core signal processing unit, which fully considers a computing capability and real-time performance of the signal processing unit, and improves processing performance during parallel processing.

4) According to the harmonic radar based on an FPGA and deep learning, compared with a traditional neural network software implementation platform, the FPGA used in the present disclosure greatly shortens a design cycle of a deep learning neural network owing to its programmability and reconstruction capability. The FPGA not only has flexibility of software, but also has a high speed of hardware, and can still shorten the design cycle greatly even for a large and complex neural network.

5) According to the harmonic radar based on an FPGA and deep learning, compared with a traditional harmonic target identification method that visualizes energy sizes of second-harmonic and third-harmonic components or converts the energy sizes of the second-harmonic and third-harmonic components into sound, the present disclosure uses the deep learning technology based on a neural network to build an artificial intelligent classification platform to learn a feature of a target harmonic audio and generate the classification model, and uses the ANN to objectively analyze a target signal, which can stably identify a plurality of types of harmonic targets, avoid an impact of a subjective factor, impose a low requirement on an operator, and make an identification process more convenient, fast, objective and accurate.

6) According to the harmonic radar based on an FPGA and deep learning, compared with traditional identification and differentiation of linear and nonlinear node targets, the present disclosure extracts and identifies features of 12 types of linear and nonlinear targets, and extracts and analyzes a subtle feature of a harmonic audio, which finally achieves an identification accuracy of 90%, and greatly improves a quantity of identification types and the identification accuracy.

7) According to the harmonic radar based on an FPGA and deep learning, compared with a traditional target harmonic signal display system, the present disclosure designs a human-computer interaction interface. A user can directly import the target harmonic audio into a deep learning and training model, draw a spectrogram of the audio after feature learning and training, and quickly obtain a target identification result.

BRIEF DESCRIPTION OF THE DRAWINGS

FIG. 22 is a schematic diagram of an output interface of a target identification module according to the present disclosure.

DETAILED DESCRIPTION OF THE EMBODIMENTS

Implementations of the present disclosure are clearly described in detail below with reference to specific embodiments and accompanying drawings.

The present disclosure provides a harmonic radar based on an FPGA and deep learning, including: a signal processing module, an RF transmitter, a transceiver antenna, a second-harmonic receiver, a third-harmonic receiver, an RF power supply, a user display module, and a target identification module.

The signal processing module is connected to the RF transmitter by using a pin structure, and the RF transmitter is connected to the transceiver antenna by using an RF cable structure; and the signal processing module is separately connected to the second-harmonic receiver, the third-harmonic receiver, the user display module, and the target identification module by using the RF cable structure.

Figure 1:
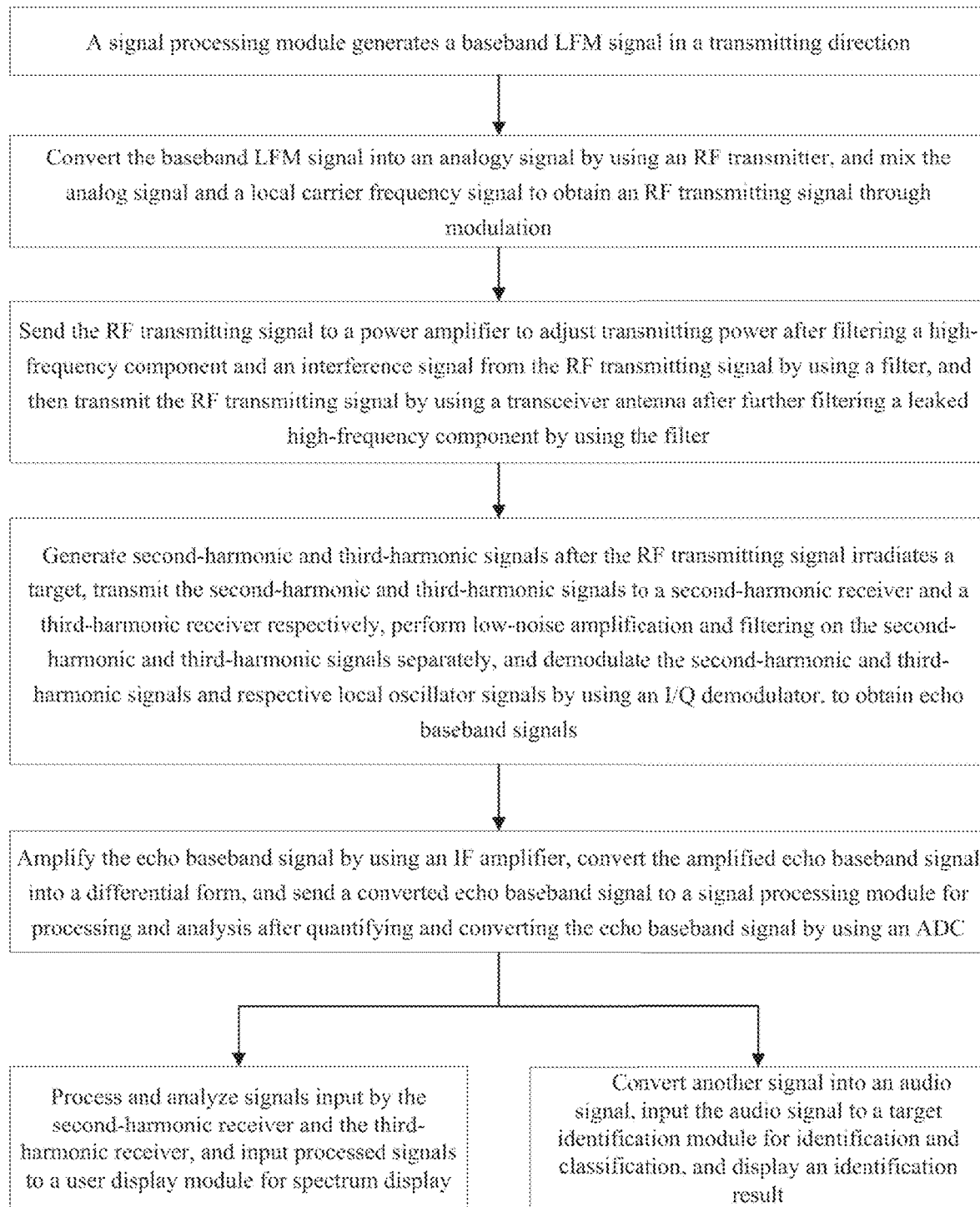
FIG. 1 is a working principle diagram of a harmonic radar based on an FPGA and deep learning according to the present disclosure.

As shown in FIG. 1, the signal processing module uses an FPGA as a core signal processing unit to generate a baseband LFM signal in a transmitting direction.

The baseband LFM signal $s_{LMF\_train}(t)$ is expressed as follows:

$$s_{LMF\_train}(t) = A \cdot \sum_{i=0}^{N-1} rect\left(\frac{t_i}{T_p}\right) e^{j2\pi(f_c t_i + \gamma t_i^2/2)}$$

$$iT - \frac{T_p}{2} \leq t_i \leq iT + \frac{T_p}{2}$$

where A represents a pulse amplitude, N represents a quantity of pulses in a single group, rect(·) represents a rectangular pulse, $$rect(u) = \begin{cases} 1, & |u| \leq 1/2 \\ 0, & others \end{cases},$$

$t_i$ represents fast time, $T_p$ represents a pulse width, $f_c$ represents a radar center frequency, and $\gamma = B/T_p$ represents an FM slope of the LFM signal, where B represents a sweep bandwidth of the LFM signal, and T represents a pulse repetition interval.

The baseband LFM signal is converted into an analog signal by a DAC of the RF transmitter, the analog signal is mixed with a carrier frequency signal generated by a local oscillator, and a mixed signal is modulated by an I/Q modulator to obtain an RF transmitting signal.

The carrier frequency signal is expressed as follows: $s_c(t) = \exp(j2\pi f_c t)$.

A baseband signal is expressed as follows:

$$s_B(t) = A \cdot \sum_{i=0}^{N-1} rect\left(\frac{t_i}{T_p}\right) e^{j2\pi(\gamma t_i^2/2)}$$

$$iT - \frac{T_p}{2} \leq t_i \leq iT + \frac{T_p}{2}$$

The obtained RF transmitting signal is in a following form:

$$s_{LMF\_train}(t) = s_c(t) \cdot s_B(t) = A \cdot \sum_{i=0}^{N-1} rect\left(\frac{t_i}{T_p}\right) e^{j2\pi(f_c t_i + \gamma t_i^2/2)}$$

$$iT - \frac{T_p}{2} \leq t_i \leq iT + \frac{T_p}{2}$$

The RF transmitting signal is sent to a power amplifier to adjust transmitting power after a high-frequency component leaked between channels and an interference signal generated by a device nonlinearly are filtered from the RF transmitting signal by using a band-pass filter, and finally radiated by the transceiver antenna after a leaked high-frequency component is further filtered by the filter.

The transmitting power is adjusted as follows: $P_t$=11.1 dBm □ 30 dBm, and a step interval is 0.5 dBm. A second-harmonic signal and a third-harmonic signal are generated after the RF transmitting signal irradiates a target, and are transmitted to the second-harmonic receiver and the third-harmonic receiver respectively. After undergoing low-noise amplification and filtering by the corresponding harmonic receiver, the second-harmonic signal and a corresponding local oscillator signal are demodulated to obtain an echo baseband signal, and the third-harmonic signal and a corresponding local oscillator signal are demodulated to obtain an echo baseband signal. A local oscillator signal of a second harmonic is: $s_{c(2)}(t) = \exp(j4\pi f_c t)$.

A receiving signal of the second harmonic is:

$$s_{Rt(2)}(t) = rect\left(\frac{\hat{t}-\tau}{T_p}\right) \exp(j4\pi f_c(\hat{t}-\tau)) \exp(j2\pi\gamma(\hat{t}-\tau)^2)$$

where $\hat{t}$ represents fast time, indicating time within each pulse relative to start time of a synchronization cycle of the pulse; and $\tau = 2R_t/c$, indicating an echo delay time at a distance $R_t$.

A demodulated baseband signal of the second harmonic is obtained, namely, $$s_{Rt(2)}(t) = rect\left(\frac{\hat{t}-\tau}{T_p}\right) \exp(j2\pi\gamma(\hat{t}-\tau)^2).$$

A local oscillator signal of a third harmonic is: $s_{c(3)}(t) = \exp(j6\pi f_c t)$.

A receiving signal of the third harmonic is:

$$s_{Rt(3)}(t) = rect\left(\frac{\hat{t}-\tau}{T_p}\right) \exp(j6\pi f_c(\hat{t}-\tau)) \exp(j3\pi\gamma(\hat{t}-\tau)^2).$$

A demodulated baseband signal of the third harmonic is obtained, namely, $$s_{Rt(3)}(t) = rect\left(\frac{\hat{t}-\tau}{T_p}\right) \exp(j3\pi\gamma(\hat{t}-\tau)^2).$$

The echo baseband signal is expressed as follows:

$$s_r(t) = s_t\left(t - \frac{2R_t}{c}\right)$$

where $R_t$ represents a distance of a single scattering point target relative to a radar, represents a light speed, and $s_t(t)$ represents a transmitting signal formed by a coherent pulse train.

The echo baseband signal is amplified by an IF amplifier and converted into a differential form, and then sent to the signal processing module for processing and analysis after being quantified and converted by an ADC.

The differential form obtained after the conversion is:

$$s_{r-}(t) = k_{11}s_r(t) + k_{12}s_{ref}$$
$$s_{r+}(t) = k_{21}s_{r-}(t) + k_{22}s_{ref},$$

where $k_{11}$, $k_{12}$, $k_{21}$, and $k_{22}$ represent fixed conversion coefficients, and $s_{ref}$ represents a fixed reference signal.

The signal processing module performs pulse compression, pulse accumulation, and identification and detection on signals input by the second-harmonic receiver and the third-harmonic receiver, and inputs processed signals to the user display module for spectrum display; and converts another second-/third-harmonic signal into an audio signal, inputs the audio signal to the target identification module for identification and classification, and displays an identification result.

A digital stretching method is adopted for the pulse compression. According to the expression of the baseband LFM signal, a baseband signal of an $n^{th}$ harmonic of the target at the distance $R_t$ of the target relative to the radar can be obtained, namely:

$$s_{R_{t(n)}}(t) = rect\left(\frac{\hat{t}-\tau}{T_p}\right)\exp(j2n\pi f_c(-\tau))\exp\left(jn\pi\gamma(\hat{t}-\tau)^2\right)$$

where $\tau=2R_t/c$, and $\hat{t}$ represents the fast time, indicating the time within each pulse relative to the start time of the synchronization cycle of the pulse.

Then, a reference signal is set as a conjugate form of an $n^{th}$ harmonic of the transmitting signal, and a reference signal at zero distance is expressed as follows:

$$s_{ref}(t) = s_t^*(t) = rect\left(\frac{t}{T_{ref}}\right)\exp\left(-jn\pi\gamma t^2\right),$$

where $T_{ref}$ represents a width of the reference signal, and a pulse width of the reference signal should be greater than a width of the transmitting signal, in other words, $T_{ref} > T_p$.

Finally, the echo signal is mixed with the reference signal to obtain a single-frequency pulse-compressed echo signal, namely:

$$s_o(t) =$$
$$s_r(t) \cdot s_{ref}(t) = rect\left(\frac{t-\tau}{T_p}\right)\exp(j2n\pi f_c(-\tau))\exp\left(jn\pi\gamma\tau^2\right)\exp(-j2n\pi r\tau t)$$

A coherent accumulation method is adopted for the pulse accumulation. An input $s_{mf}(\hat{t},n)$ of a coherent accumulation model is an output of each pulse-compressed echo signal, where the variable $\hat{t}$ represents the fast time, the variable n represents a quantity of echo pulse sequences, and n or $t_n=nT_r$ is referred to as slow time. An output $s_{accum}(\hat{t}, f_k)$ of the model is a time-domain-Doppler domain two-dimensional signal obtained after coherent accumulation, where $f_k$ represents a discrete Doppler frequency. A time domain-Doppler domain is commonly known as a R-D domain. Therefore, the coherent accumulation can also be referred to as pulse-Doppler (PD) processing.

In a design of the present disclosure, a coherent pulse train is used as the transmitting signal, and its mathematical model is expressed as follows:

$$s_t(t) = \sum_{n=0}^{N-1} s_{LMF\_train}(t - nT_r)$$

where $T_r$ represents a pulse repetition cycle.

It is assumed that a distance of the single scattering point target relative to the radar at an initial time point is $R_0$, the target performs radial uniform linear motion relative to the radar, a motion speed is v, and a speed symbol is positive when the target is close to the radar and negative when the target is far away from the radar. Delay tine of each pulse echo can be obtained, namely, $$\tau_n = \frac{2(R_0 - vnT_r)}{c}, n = 0, 1, \ldots, N-1.$$

Therefore, an echo pulse train received by the radar can be expressed as follows:

$$s_r(t) = \sum_{n=0}^{N-1} s(t - nT_r - \tau_n)\exp[j\omega_c(t - \tau(t))].$$

After digital down-conversion and the pulse compression are performed on the transmitted baseband LFM signal, an expression of a signal obtained after the pulse compression is performed on an $n^{th}$ echo in a time domain can be obtained.

Specifically, the input $s_{mf}(\hat{t},n)$ of the coherent accumulation is the output of each pulse-compressed echo signal, where the variable n represents the quantity of echo pulse sequences, and $t_n=nT_r$ represents the slow time. The output $s_{accum}(\hat{t},f_k)$ of the coherent accumulation is the time-domain-Doppler domain two-dimensional signal obtained after the coherent accumulation, where $f_k$ represents the discrete Doppler frequency.

The expression of the signal $s_{nf}(\hat{t},n)$ obtained after the pulse compression is performed on the $n^{th}$ echo is as follows:

$$s_{mf}(\hat{t}, n) = \sqrt{Bt_p} Sa[\pi B(\hat{t} - \tau_n)]\exp\left(-j\omega_c\frac{2R_0}{c}\right)\exp(j\omega_d nT_r)$$

where $\omega_d = 2\pi f_d$, and $f_d = f_c\frac{2v}{c}$ represents a Doppler frequency caused by motion of the target; $\tau_n$ represents the delay time of the pulse echo; $R_0$ represents the distance of the single scattering point target to the radar at the initial time point; B represents a signal bandwidth; $t_p$ represents the pulse width; $\omega_c=2\pi f_c$, and $f_c$ represents the radar center frequency; and an Sa function is a sampling function, and $$Sa(x) = \frac{\sin(x)}{x}.$$

According to a coherent accumulation theory, the pulse accumulation can be realized through discrete Fourier transform (DFT). Considering only phase information, the DFT is performed on the variables in the above formula, and constant terms are ignored. Finally, the two-dimensional signal $s_{accum}(\hat{t}, f_k)$ in the range-doppler domain displayed by a spectrum is expressed as follows:

$$S_{accum}(\hat{t}, k) = \sum_{n=0}^{N-1} \exp\left[j\left(\omega_d T_r - \frac{2\pi}{N}k\right)n\right] =$$

$$\frac{\sin\left[N\pi\left(f_d - \frac{k}{NT_r}\right)T_r\right]}{\sin\left[\pi\left(f_d - \frac{k}{NT_r}\right)T_r\right]} \exp\left[j\pi(N-1)\left(f_d - \frac{k}{NT_r}\right)T_r\right],$$

$$k = 0, 1, \ldots, N-1$$

It is set that $$f_k = \frac{k}{NT_r},$$

which is substituted into the above formula to obtain an amplitude-frequency response of an accumulated signal in a Doppler domain:

$$|S_{accum}(\hat{t}, f_k)| = \left|\frac{\sin[N\pi(f_k - f_d)T_r]}{\sin[\pi(f_k - f_d)T_r]}\right|$$

It can be seen that through the coherent accumulation, N periodic echoes located in a slow-time domain of a same distance unit are sampled and converted into narrow pulse signals in the Doppler domain, and a pulse peak is located at a Doppler frequency shift $f_d$, such that speed information of a moving target can be extracted from an amplitude envelope of the signal in the Doppler domain after the PD processing.

The identification and detection adopts an improved variable index constant false alarm rate (VI-CFAR) detection algorithm based on an extremes elimination method and an OS-CFAR (VIEEMOS-CFAR) to use different frequency domain detection algorithms based on ambient noise as well as second-harmonic and third-harmonic power radiated by different targets to determine whether the targets exist.

When CFAR detection is performed by using a sliding window structure, a detection unit D is first selected, and a protection unit around the detection unit is reserved. An output result of the pulse accumulation is sent to a sliding window detection structure, and VIs $VI_A$ and $VI_B$ of a front reference window (represented by A) and a rear reference window (represented by B), as well as a mean ratio (MR) MR of the two VIs are calculated to determine whether background environments of the front and rear windows are uniform and whether mean values of the front and rear windows are the same. Then, one of the front reference window, the rear reference window, or a full reference window is selected based on a determining result to estimate background power, and a corresponding threshold factor is selected based on a length of the reference window. The threshold factor is multiplied by the background power to obtain a decision threshold, and the decision threshold is compared with a to-be-detected unit to determine whether the target exists.

$\alpha_{N/2}$ and $\alpha_N$ respectively represent threshold factors corresponding to the semi reference window and the full reference window, and their calculation formulas are as follows:

$$\begin{cases} \alpha_{N/2} = P_{fa}^{-1/(N/2)} - 1 \\ \alpha_N = P_{fa}^{-1/N} - 1 \end{cases}$$

The statistical magnitude VI is used to determine whether the background environment of the reference window is uniform, which can be obtained according to a following formula:

$$VI = 1 + \frac{\hat{\delta}^2}{\hat{\mu}^2} = 1 + \frac{1}{n}\sum_{i=1}^{n}(x_i - \hat{\mu})^2/\hat{\mu}^2$$

where $x_i$ represents a sample unit value, $\hat{\delta}^2$ represents a variance, and $\hat{\mu}$ represents a mean sample value in the reference window.

The MR is used to determine whether statistical mean values of the front and rear reference windows are the same, and its calculation formula is as follows:

$$MR = \frac{\overline{X}_A}{\overline{X}_B} = \sum_{i \in A} X_i / \sum_{i \in B} X_i$$

where $\overline{X}_A$ represents the mean value of the front reference window, and $\overline{X}_B$ represents the mean value of the rear reference window.

A specific method for determining a clutter background of the reference window includes following two aspects:

$$\begin{cases} VI \leq K_{VI} & \text{uniform clutter} \\ VI > K_{VI} & \text{non-uniform clutter} \end{cases}$$

$$\begin{cases} K_{MR}^{-1} \leq MR \leq K_{MR} & \text{same mean value} \\ MR < K_{MR}^{-1} \text{ or } MR > K_{MR} & \text{different mean values} \end{cases}$$

$K_{VI}$ and $K_{MR}$ are preset comparison thresholds. When the statistical magnitude VI is not greater than the threshold $K_{VI}$, it is considered that there is a uniform clutter in the reference window, otherwise it is considered that there is a non-uniform clutter in the reference window. When the MR MR is less than or equal to $K_{MR}$ and greater than or equal to $K_{MR}^{-1}$, the mean values of the two reference windows are considered the same, otherwise the mean values of the two reference windows are considered different.

CFAR selection of the VIEEMOS-CFAR is shown in a following table:

| Environment type | Whether the front reference window is uniform | Whether the rear reference window is uniform | Whether the mean values of the front and rear reference windows are the same | Corresponding CFAR policy |
|---|---|---|---|---|
| 1 | Yes | Yes | Yes | Full window CA-CFAR |
| 2 | Yes | Yes | No | GO-CFAR |
| 3 | Yes | No | — | Extremes elimination method |

-continued

| Environment type | Whether the front reference window is uniform | Whether the rear reference window is uniform | Whether the mean values of the front and rear reference windows are the same | Corresponding CFAR policy |
|---|---|---|---|---|
| 4 | No | Yes | — | Extremes elimination method |
| 5 | No | No | — | OS-CFAR |

For environment types 1 and 2, that is, when the front and rear windows are determined to be uniform, if the mean values of the front and rear windows are the same, a full-window CA-CFAR detection method is used for processing; or if the mean values of the front and rear windows are different, a GO-CFAR detection method is used for processing.

For environment types 3 and 4, that is, when only one of the front and rear windows is determined to be uniform, two maximum values and two minimum values of the non-uniform window are eliminated. If the front and rear windows both are determined to be uniform after the elimination operation, the mean values of the front and rear windows are determined. If the mean values of the front and rear windows are the same, the CA-CFAR detection method can be directly used for processing. If the mean values of the front and rear windows are different, the GO-CFAR detection method is used for processing. If one of the front and rear windows is still non-uniform after the elimination operation, as long as a quantity of reference cells on the non-uniform window is greater than 4, an operation of cyclically eliminating an extreme value can be performed. If the quantity of reference cells on the non-uniform window is less than 4, the CA-CFAR detection method is used only for the uniform window.

For an environment type 5, that is, when the front and rear windows both are determined to be non-uniform, it is possible that a plurality of adjacent targets coexist. The OS-CFAR detection method maintains stable detection performance for both uniform background noise and clutter edge regions. Therefore, the OS-CFAR detection method is adopted herein to improve detection efficiency of a non-uniform environment.

To specifically identify semiconductor and metallic contact targets, it is required to compile a frequency domain detection algorithm based on ambient noise as well as second-harmonic and third-harmonic power radiated by different targets to determine whether the targets exist.

After the detection starts, a pulse quantity $N_{start}$ at the beginning of the processing and a pulse quantity $N_{stop}$ at the end of the processing are first initialized, constants $K_1$, $K_2$, and $K_3$ are set based on a detection performance requirement, and a current value N of a pulse counter is set to be equal to $N_{start}$. Then a program enters to a state of waiting for arrival of a wave gate. If the wave gate arrives and the value N of the pulse counter at this moment is less than a specified quantity of accumulated pulses, the program skips to a wave gate detection procedure after completing the pulse compression and storing a result, and continues to wait for arrival of a wave gate. The program skips to execute a pulse accumulation module only when the value N of the pulse counter is equal to the specified quantity of accumulated pulses, to read previously stored data, conduct the pulse accumulation after pre-processing, and then output a result of the pulse accumulation to a CFAR detection module to obtain ambient noise power Z, second-harmonic power $Y_{HR2}$, and third-harmonic power $Y_{HR3}$. Then, the harmonic power is first compared with a detection threshold to determine whether the target is detected. If both the second-harmonic power $Y_{HR2}$ and the third-harmonic power $Y_{HR3}$ are less than the detection threshold $K_1 \cdot Z$, it is determined that the target is not detected, and the program returns to a start position and waits for a next detection. If it is determined that the target is detected, the program executes the target identification module for identifying the target. If the second-harmonic power $Y_{HR2}$ is greater than a third-harmonic echo threshold $K_2 \cdot Y_{HR3}$, it is determined that the semiconductor target is detected. If the third-harmonic power $Y_{HR3}$ is greater than a second-harmonic echo threshold $K_3 \cdot Y_{HR2}$, it is determined that the metallic contact target is detected. If neither of the above two conditions is met, it is determined that an unknown target is detected. So far, the system has finished a complete target detection and identification process.

The audio conversion includes AM audio conversion and FM audio conversion.

1) A process of converting harmonic power $Y_{HR2}(t)$ obtained by sketching the second harmonic into an AM audio signal is as follows:

setting a sinusoidal carrier of the AM audio signal of the second harmonic as follows:

$$c_2(t) = A_2 \cos(\omega_{c2}t + \phi_0)$$

where $A_2$ represents a carrier amplitude of the second harmonic; $\omega_{c2}$ represents a carrier angular frequency of the second harmonic; and $\phi_0$ represents an initial phase of the carrier (it is generally assumed that $\phi_0 = 0$); and expressing, based on a definition of modulation, an AM signal of the second harmonic as follows: $s_{AM\,2}(t) = A_2 Y_{HR2}(t) \cos(\omega_{c2}t)$.

2) A process of converting harmonic power $Y_{HR3}(t)$ obtained by sketching the third harmonic into an AM audio signal is as follows:

setting a sinusoidal carrier of the AM audio signal of the third harmonic as follows:

$$c_3(t) = A_3 \cos(\omega_{c3}t + \phi_0)$$

where $A_3$ represents a carrier amplitude of the third harmonic; and $\omega_{c3}$ represents a carrier angular frequency of the third harmonic; and expressing, based on the definition of modulation, an AM signal of the third harmonic as follows: $s_{AM3}(t) = A_3 Y_{HR3}(t) \cos(\omega_{c3}t)$.

3) A process of converting the harmonic power $Y_{HR2}(t)$ obtained by sketching the second harmonic into an FM audio signal is as follows:

setting a sinusoidal carrier of the FM audio signal of the second harmonic as follows:

$$c_2(t) = A_2 \cos(2\pi f_{c2}t)$$

where $f_{c2}$ represents a carrier frequency of the second harmonic;

during the modulation, a frequency of a modulation signal is used to control a frequency change of the carrier, and an instantaneous frequency offset of the carrier changes in a direct proportion with the modulation signal $Y_{HR2}(t)$, namely, $$\frac{d\varphi_2(t)}{dt} = K_{f2} \cdot Y_{HR2}(t)$$

where $K_{f2}$ represents FM sensitivity;
in this case, a phase offset is $\Phi_2(t)=K_{f2}\int Y_{HR2}(\tau)d\tau$; and expressing an FM signal of the second harmonic as follows:

$$s_{FM2}(t)=A_2 \cos[2\pi f_{c2}t+K_{f2}\int Y_{HR2}(\tau)d\tau]$$

where $K_{f2}$ represents FM sensitivity of the second harmonic.
4) A process of converting the harmonic power $Y_{HR3}(t)$ obtained by sketching the third harmonic into an FM audio signal is as follows:
setting a sinusoidal carrier of the FM audio signal of the third harmonic as follows:

$$c_3(t)=A_3 \cos(2\pi f_{c3}t)$$

where $f_{c3}$ represents a carrier frequency of the third harmonic;
during the modulation, a frequency of a modulation signal is used to control a frequency change of the carrier, and an instantaneous frequency offset of the carrier changes in a direct proportion with the modulation signal $Y_{HR3}(t)$, namely, $$\frac{d\varphi_3(t)}{dt} = K_{f3} \cdot Y_{HR3}(t),$$

where $K_{f3}$ represents FM sensitivity;
in this case, a phase offset is $\varphi_3(t)=K_{f3}\int Y_{HR3}(\tau)d\tau$; and expressing an FM signal of the third harmonic as follows:
$s_{FM3}(t)=A_3 \cos[2\pi f_{c3}t+K_{f3}\int Y_{HR3}(\tau)d\tau]$, where $K_{f3}$ represents the FM sensitivity.

The audio signal is identified, classified, and detected by using an accumulation method based on a frequency-domain feature to learn a feature of an audio signal database collected by the harmonic radar and generate a classification model. Specifically, based on a frequency dimension of the spectrogram, an audio data feature collected by the harmonic radar is accumulated to make a frequency feature more obvious, and then an accumulated new feature is sent to a CNN for deep learning and identification.

Figure 2:
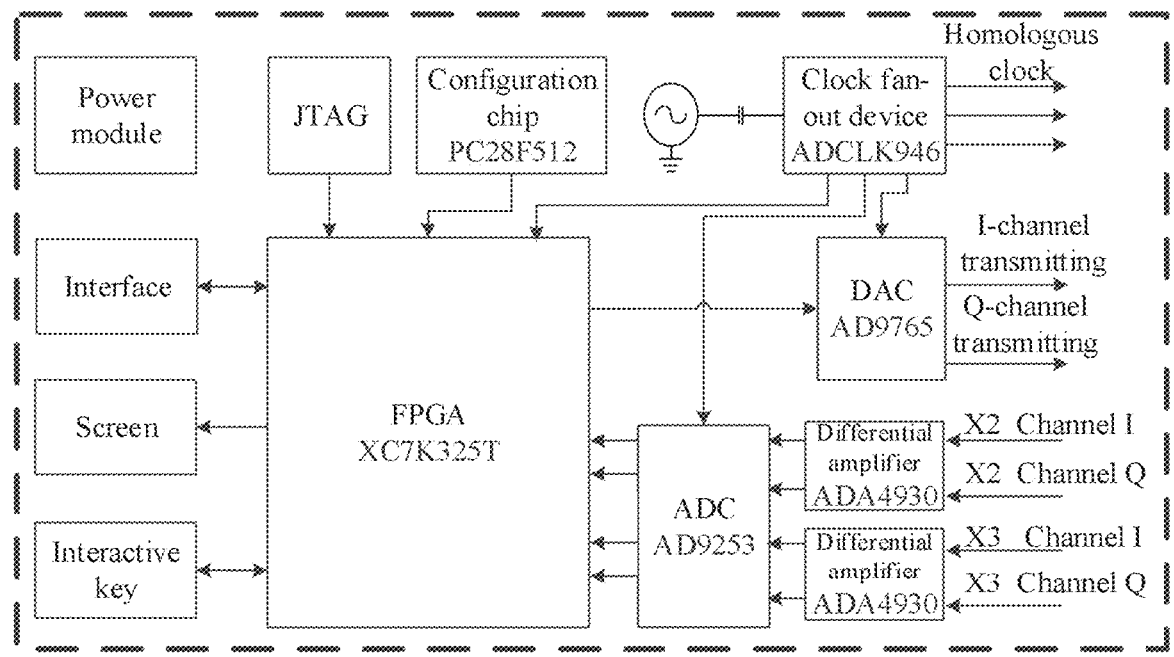
FIG. 2 is a block diagram of a hardware structure of a signal processing module according to the present disclosure.

As shown in FIG. 2, the signal processing module further includes the DAC, the ADC, a clock source, a fan-out device, the FPGA, a differential amplification circuit, an audio codec module, a network interface module, a power module, and the like.

A whole IF signal processing board uses homologous clocks, which are separated by using the clock source and the fan-out device, to drive the ADC, the DAC, the FPGA, a local oscillator of the transmitter, a local oscillator of the receiver, and other devices to meet a coherent design requirement of the system. The network interface module provides an external interface bus to drive other add-on devices. Because a detection result of a nonlinear object also needs to be displayed, a key, a screen, and other modules also need to be provided for a user to perform data exchange.

Figure 3:
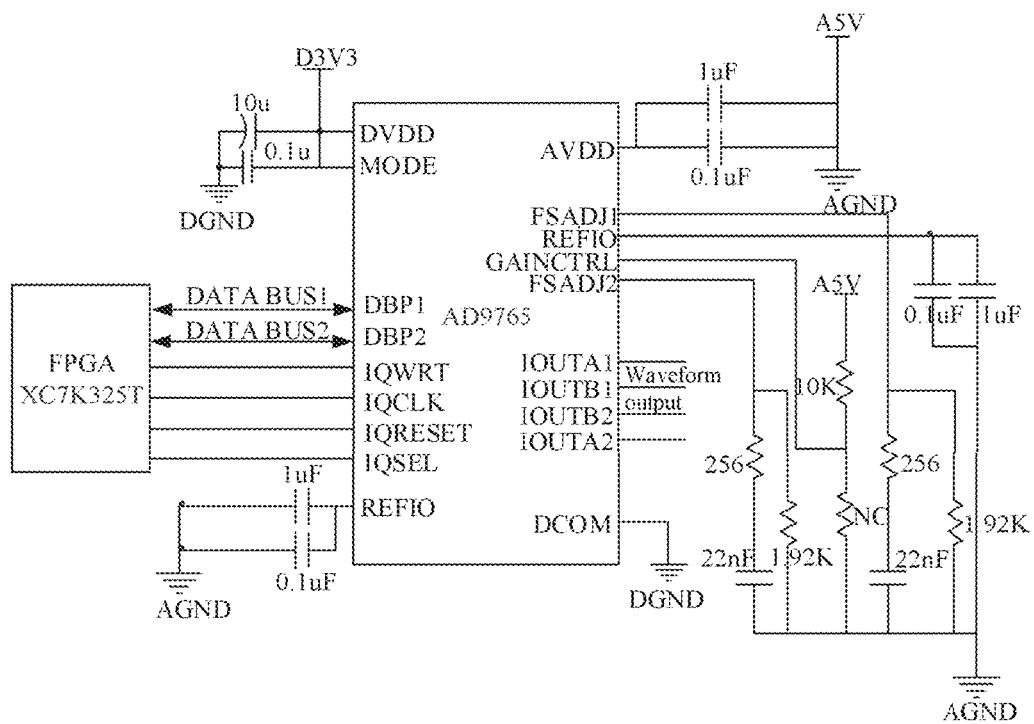
FIG. 3 is a principle diagram of a peripheral circuit of a DAC of a signal processing module according to the present disclosure.

The DAC is configured to perform digital-to-analog conversion on a baseband LFM signal with a bandwidth of 1.5 MHz. A data update rate of the DAC should be greater than twice the signal bandwidth to meet a basic requirement of signal reconstruction, and a faster update rate of the DAC module leads to smaller data distortion. When the DAC is selected, a quantity of data bits, a conversion rate, conversion precision, a quantification error, power consumption, and other requirements should be considered, and an AD9765 chip produced by ADI is preferred. FIG. 3 is a principle diagram of a peripheral circuit of the DAC chip.

Figure 4:
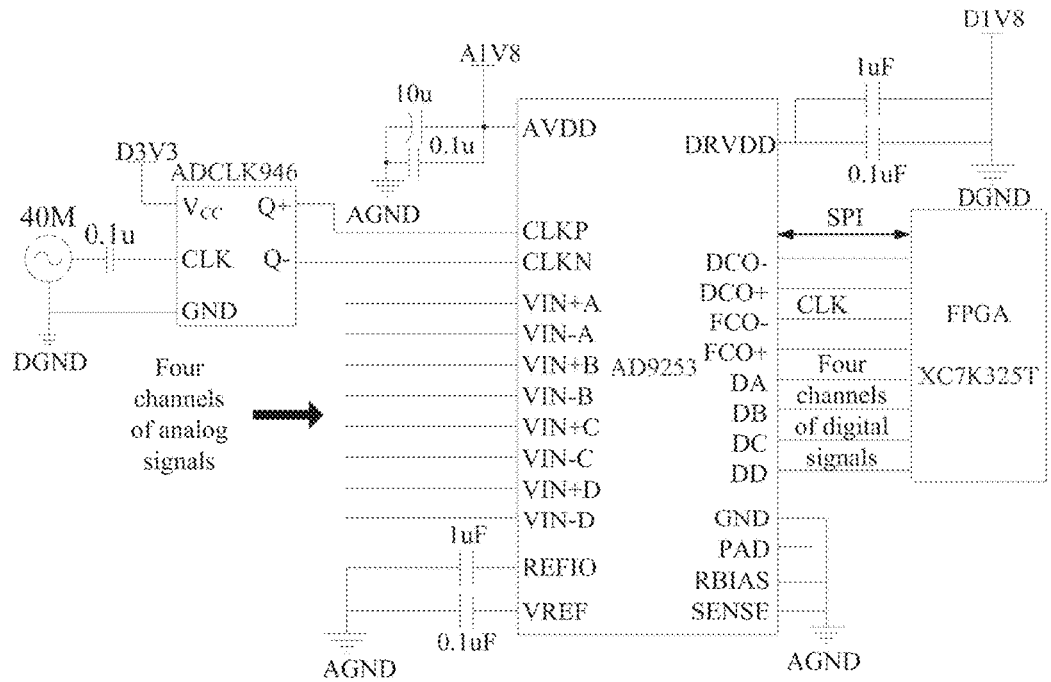
FIG. 4 is a principle diagram of a peripheral circuit of an ADC of a signal processing module according to the present disclosure.

The ADC is configured to digitally quantify the echo baseband signal and send the quantified echo baseband signal to a rear-end digital processing unit for processing. In a process of selecting the ADC, it is necessary to consider such indexes as a detectable signal range, conversion precision, and noise coefficient rise, and also pay attention to such parameters as a spurious free dynamic range (SFDR), a differential nonlinearity error, and an integral nonlinearity error. A higher SFDR leads to a better suppression effect of the chip for a stray component. A smaller differential nonlinear error leads to a smaller actual level difference of triggering two consecutive output codes relative to an ideal deviation value, and a smaller integral nonlinear error leads to a smaller deviation between an actual transfer function of the ADC and an ideal transfer function. The differential nonlinear error and the integral nonlinear error determine accuracy of the ADC to a great extent. An AD9253 chip of ADI is preferred. FIG. 4 is a principle diagram of a peripheral circuit of the ADC.

Figure 5:
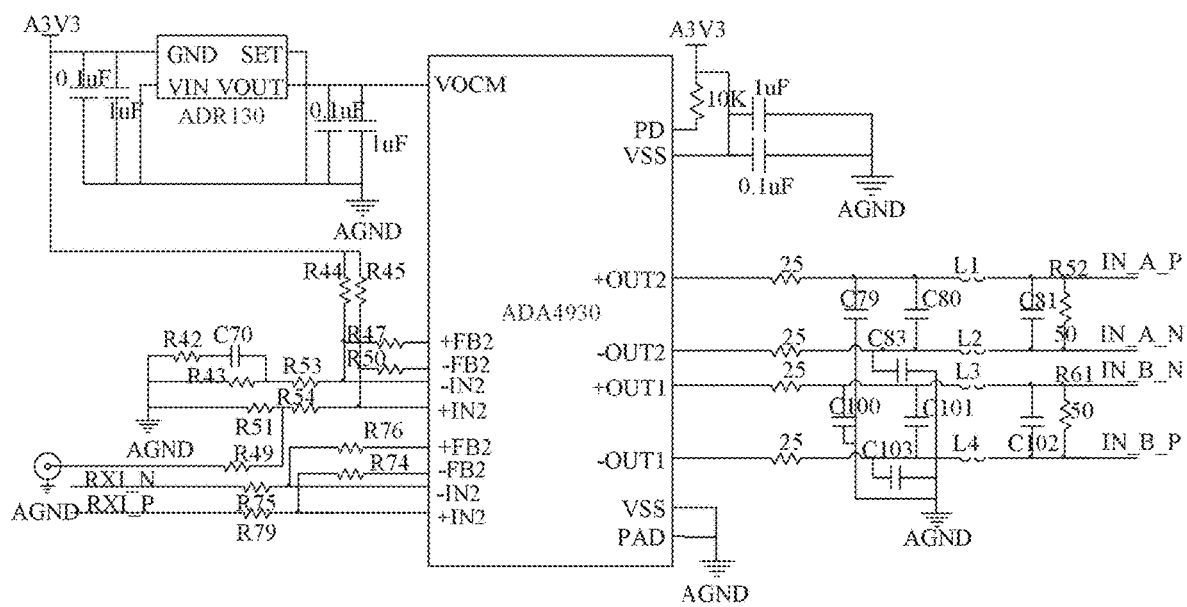
FIG. 5 is a principle diagram of a differential amplification and filtering circuit of a signal processing module according to the present disclosure.

Since minimum detectable signal power of the ADC is only −63.45 dBm, to reach a sensitivity of −130 dBm, it is necessary to provide a gain of at least 66.55 dB. Although minimum gains of secondary and tertiary RF receivers are designed to be only 55.6 dB, there is still a gain gap of 11 dB to be provided by the IF amplifier. Since an input bias voltage of the AD9253 is 0.9 V, and an output bias voltage of a demodulator ADL5380 of a secondary receiving channel is 2.5 V, if the AD9253 and the ADL5380 are directly connected, the ADC will lose a large part of the dynamic range, and bias voltage conversion is required between the ADC and the ADL5380. In addition, an output of a demodulator HMC951B of a tertiary receiving channel is single-ended. Therefore, it is necessary to arrange a suitable single-ended-to-differential circuit at a rear end of the demodulator to achieve impedance matching and obtain better digital quantification performance A differential amplifier is preferably ADA4930 of ADI, which is used for single-ended and differential circuit conversion. An output common-mode voltage is adjustable, which perfectly resolves a problem of a mismatch between the output common-mode voltage of the front-end demodulator and the input bias voltage of the rear-end ADC. FIG. 5 is a principle diagram of a differential amplification and filtering circuit.

Figure 6:
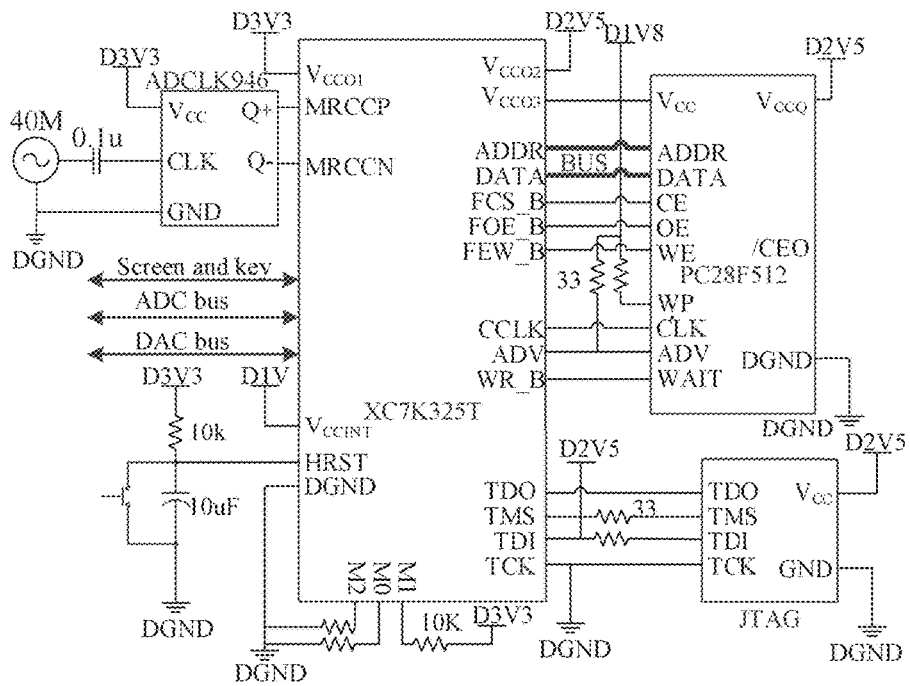
FIG. 6 is a principle diagram of a minimum system circuit of an FPGA of a signal processing module according to the present disclosure.

As a core unit, the FPGA is responsible for timing control, data access, and user interactive display of a peripheral device, baseband transmitting signal generation, and pulse compression, pulse accumulation, and identification and detection of the echo baseband signal. XC7K325T produced by Xilinx is preferably selected as the FPGA chip. The chip is made by using a 28 nm technology. With rich resources and sufficient user ports, the chip supports a 500 MHz high clock frequency, and is excellent in high-speed data processing, which can meet requirements of data transmission and echo signal processing. A hardware circuit of the FPGA includes the FPGA, a Flash configuration circuit, a clock/reset circuit, and a user interface. The user interface includes a DAC bus, an ADC bus, a screen, a key, and the like. FIG. 6 is a principle diagram of a minimum system circuit of the FPGA.

The audio codec module makes amplitude levels of processed second and third harmonics correspond to different frequency values, uses a DDS IP core in the FPGA to generate a corresponding sinusoidal signal within an audible range of a human ear, configures a WM8731 audio codec chip, inputs a signal to the WM8731 audio codec chip, and outputs a corresponding audio signal. The WM8731 audio codec chip is preferred.

The network interface module is directly connected to the FPGA, and configures the chip by using the FPGA. A specific network protocol is implemented through internal programming of the FPGA. An M88E1111 interface protocol chip is preferred, and 10M, 100M, and 1000M network connection modes are supported.

Figure 7:
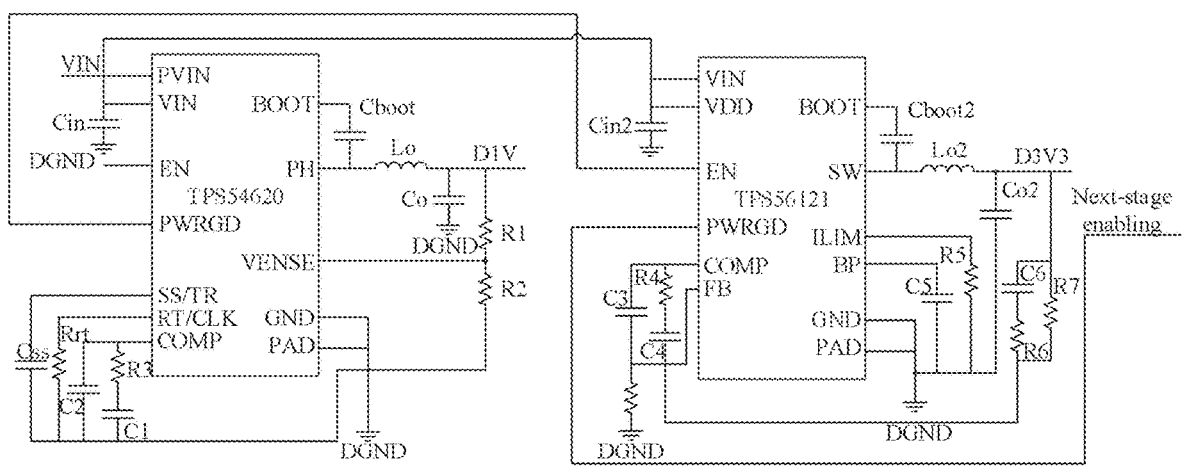
FIG. 7 is a principle diagram of a digital power supply circuit of a signal processing module according to the present disclosure.

The power module mainly supplies power to each circuit module of an IF signal processing circuit. A DAC circuit needs to be powered by a 5 V analog power supply and a 3.3 V digital power supply, an ADC circuit needs to be powered by 1.8 V digital and analog power supplies, the differential amplification circuit needs to be powered by a 3.3 V analog power supply, and an FPGA circuit needs to be powered by 1.0 V, 1.8 V, 2.5 V, and 3.3 V digital power supplies. An analog part of a signal processing system has a relatively low power consumption, and requires a current of not more than 300 mA. An analog power supply required by the analog part can be directly introduced from an RF power supply, but power supply decoupling and a power supply return path need to be considered in the introduction process. A digital circuit of the signal processing module has a high power consumption, but does not require a high linearity for the power supply. Considering that frequent digital signal hopping will affect an analog circuit, a digital power supply circuit is designed separately. A TPS54620 produced by TI is preferred to support a 4.5 V to 17 V voltage input, and an external configuration resistor is disposed to provide a 0.8 V to 17 V voltage output, with a maximum output current of 6 A. A TPS56121 chip is preferred to support a 4.5 V to 14 V voltage input, and a 0.6 V to 14 V voltage output, with a maximum output current of 15 A. The two chips integrate soft start, overcurrent protection and loop compensation functions, and each can be turned off by enabling a pin, to control a power-on sequence of the system. FIG. 7 is a principle diagram of the digital power supply circuit.

Figure 8:
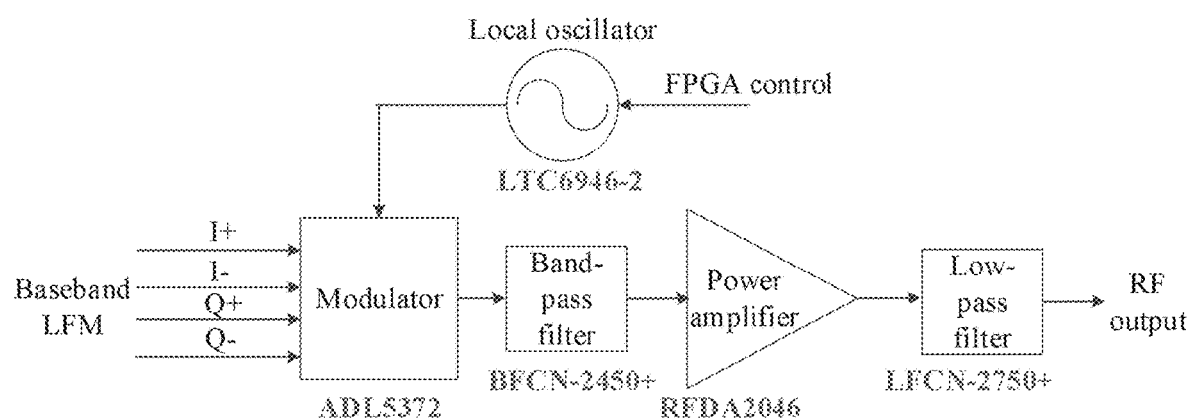
FIG. 8 is a block diagram illustrating a design of an RF transmitter according to the present disclosure.

As shown in FIG. 8, hardware of the RF transmitter includes the local oscillator, the I/Q modulator, the power amplifier, and a cascaded filtering circuit.

The local oscillator generates the carrier frequency signal, the I/Q modulator modulates the LFM signal and the carrier frequency signal to obtain the RF transmitting signal; and the RF transmitting signal is sent to the power amplifier to adjust the transmitting power after the high-frequency component leaked between the channels and the interference signal generated by the device nonlinearly are filtered from the RF transmitting signal by using the band-pass filter, and finally radiated by a transmitting antenna after the leaked high-frequency component is further filtered by the cascaded filtering circuit.

The local oscillator is mainly responsible for generating the carrier frequency signal. A local oscillator chip needs to meet a certain frequency division ratio to output a signal of a frequency of 2404 MHz to 2472 MHz. Harmonic distortion and phase noise of the local oscillator should be as small as possible, output signal power of the local oscillator should be as high as possible. An ultra-low noise, ultra-low spurious, high-performance local oscillator LTC6946 produced by Linear and integrating a voltage controlled oscillator is preferred, which has excellent spurious performance. The LTC6946 internally integrates a low-noise reference buffer, and a normalized in-band phase noise layer is only −226 dBc/Hz. The chip reserves a serial peripheral interface (SPI), and adjusts an output frequency range to 373 MHz to 6390 MHz by changing and configuring a VCO output frequency divider (level 1 to level 6). The LTC6946 can calibrate an output frequency internally, requiring no support by an external circuit.

The I/Q modulator is used to modulate the transmitted baseband LFM signal and the carrier frequency signal. An output range of the I/Q modulator must be greater than an operating frequency range of the transmitter. The I/Q modulator is required to have a modulator chip with a large bandwidth, small ground noise, a small carrier leakage, and a small harmonic leakage. An ADL5372 of ADI is preferred. The ADL5372 supports input of a dual-channel differential baseband signal, a single-ended output after mixing, an output frequency range of 1500 MHz to 2500 MHz, and a 3 dB modulation bandwidth greater than 500 MHz, which is very suitable for a design of a zero-IF RF transmitter and has a strong anti-interference capability.

The power amplifier is responsible for amplifying the transmitting signal to a certain intensity to meet an irradiation power requirement of a nonlinear target for generating a harmonic radiation. When the power amplifier is selected, a sufficient amplification gain and a fine amplification step shall be provided to meet requirements for an amplification factor of a small signal and a system dynamic range. Higher output power of the power amplifier leads to a larger corresponding action distance of the harmonic radar, but output power of the power amplifier cannot be too high. Because the power amplifier will also amplify an interference noise signal and a harmonic generated nonlinearly by the power amplifier, a noise floor, a 1 dB compression point (P1 dB), an output $3^{rd}$ order intercept point (OIP3), and other indexes should be considered when the power amplifier is selected. A digitally-controlled variable-gain power amplifier RFDA2046 produced by RFMD is preferred, which has an operating frequency range of 2000 MHz to 2800 MHz and a maximum gain of 41 dB. An amplification gain can be controlled easily and finely by using a reserved SPI, with a control step of 0.5 dB and a control range of 31.5 dB. A noise coefficient of the RFDA2046 is only 5.2 dB, the P1 dB may reach 28 dBm, and the OIP3 may reach 41 dBm. In addition, the RFDA2046 internally integrates input/output matching, requiring no external bias.

A first-stage filter in the cascaded filtering circuit is a band-pass filter, which is mainly used to filter the high-frequency component leaked between the channels of the power amplifier and the interference signal generated by the device nonlinearly. A band-pass filter BFCN-2450+ is preferred, with an impedance of 50Ω, a pass-band of 2400 MHz to 2550 MHz. An insertion loss in the pass-band is about 2 dB, a high-frequency stopband insertion loss is not less than 20 dB, and a low-frequency stopband insertion loss may each 30 dB. A second-stage filter is a low-pass filter, which is mainly used to filter high-frequency noise interference after signal amplification to prevent the high-frequency noise interference from being directly coupled to the receiving channel through the antenna. An in-band insertion loss of a selected filter should not be too high, to ensure the transmitting power of the transmitter. A low-pass filter LFCN-2750+ is preferred, with a pass-band of 0 MHz to 2750 MHz, an insertion loss in the pass-band of about 0.7 dB, and insertion losses of about 44 dB and 26 dB for second-harmonic and third-harmonic frequencies respectively. The LFCN-2750+ is used to filter the high-frequency noise interference after the signal amplification, and prevent the high-frequency noise interference from being directly coupled to the receiving channel through the antenna.

Figure 9:
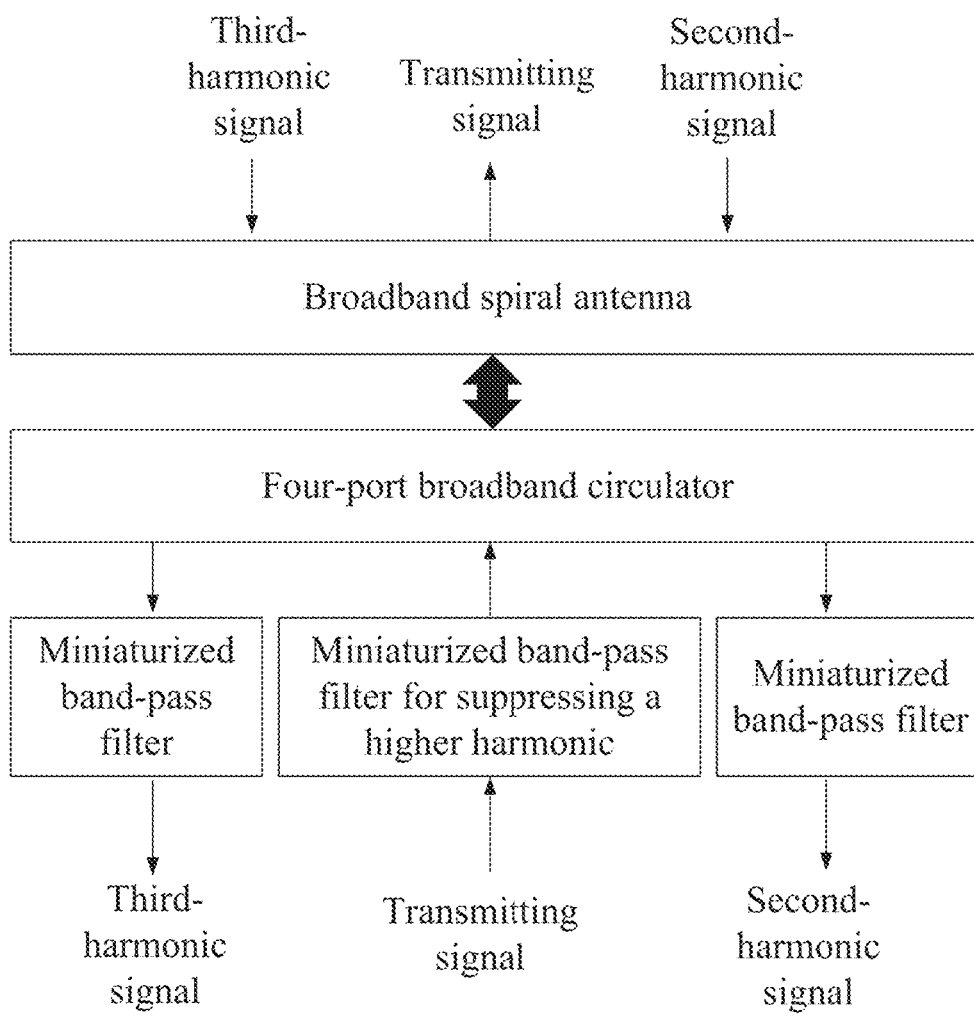
FIG. 9 is a principle diagram of a transceiver antenna according to the present disclosure.

The transceiver antenna is configured to transmit a wireless signal and receive second and third harmonics of the target. As shown in FIG. 9, the transceiver antenna specifically includes a broadband spiral antenna, a four-port broadband circulator for harmonic suppression, and a miniaturized band-pass filter for suppressing a higher harmonic.

When the transceiver antenna works, a lower control circuit transmits an excitation to the antenna. A 2.4 GHz signal is preferably transmitted. When the signal contacts a target object, a 4.8 GHz second harmonic and a 7.2 GHz third harmonic are generated, which are then received by the antenna. The antenna feeds the 4.8 GHz second harmonic and the 7.2 GHz third harmonic back to the lower control circuit, and the lower control circuit transmits them to the RF transmitter.

Figure 10:
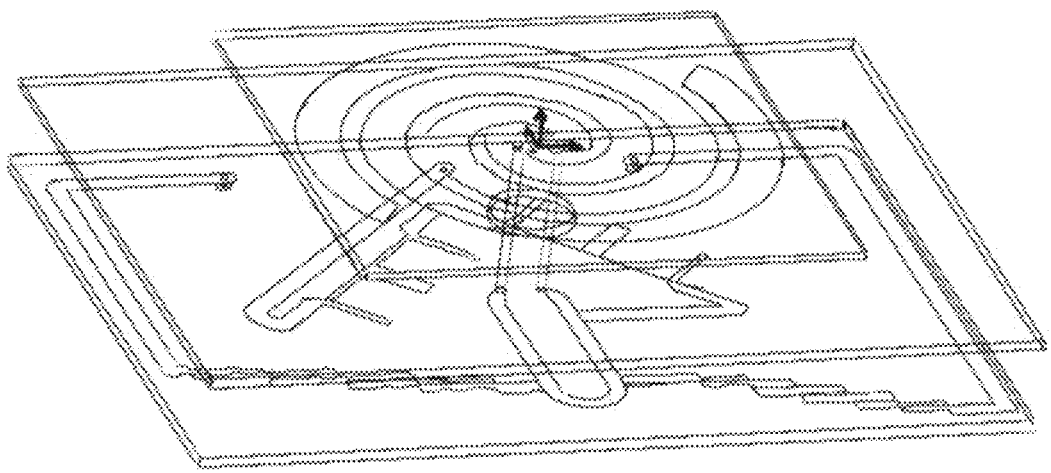
FIG. 10 is a schematic diagram of an Archimedean spiral antenna used as a transceiver antenna according to an embodiment of the present disclosure.

The transceiver antenna in this embodiment is an Archimedean spiral antenna. As shown in FIG. 10, the transceiver antenna is composed of three FR-4 boards, which are named a board 1, a board 2, and a board 3 from top to bottom; and includes an output port, a second-harmonic port, and a third-harmonic port. A double-arm Archimedean spiral antenna is printed on an upper surface of the board 1, and a center of the board 1 is connected to a feed network of the board 3 through two metallic pins. An upper surface of the board 2 is a floor that isolates the antenna from the feed network, and there is a circular nonmetallic via hole in a center of the board 2. An upper surface of the board 3 is the feed network. First, 2.4 GHz, 4.8 GHz and 7.2 GHz antennas are separated by the circulator. Then, 4.8 GHz and 7.2 GHz filters that are in a form of microstrip line are equipped at the second-harmonic port and the third-harmonic port respectively, and two 2.4 GHz filters are equipped at a transmitting port to increase isolation between ports. A lower surface of the board 3 is the floor.

During working, the antenna excites a port to emit a 2.4 GHz electromagnetic wave, receives a reflected second or third harmonic after the electromagnetic wave contacts the target, and then transmits the harmonic signal to an RF network through an SMP connector.

Figure 11:
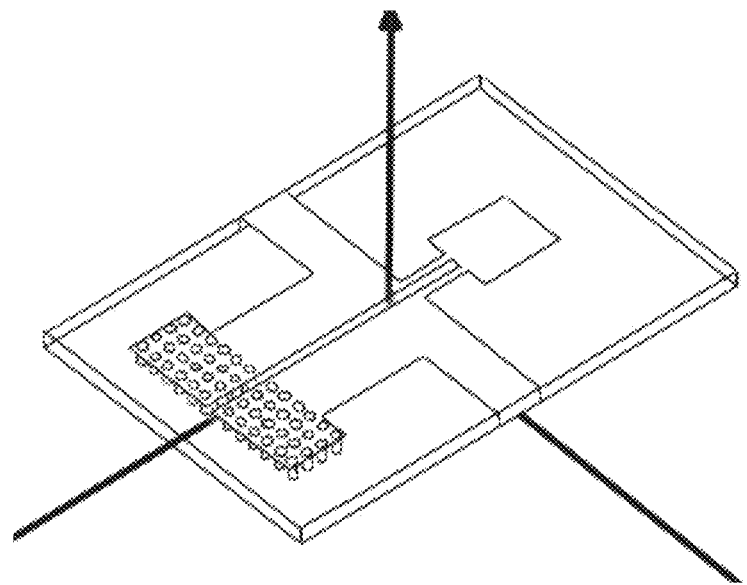
FIG. 11 is a structural block diagram of a transceiver antenna using a single higher-harmonic suppression filter according to an embodiment of the present disclosure.
Figure 12:
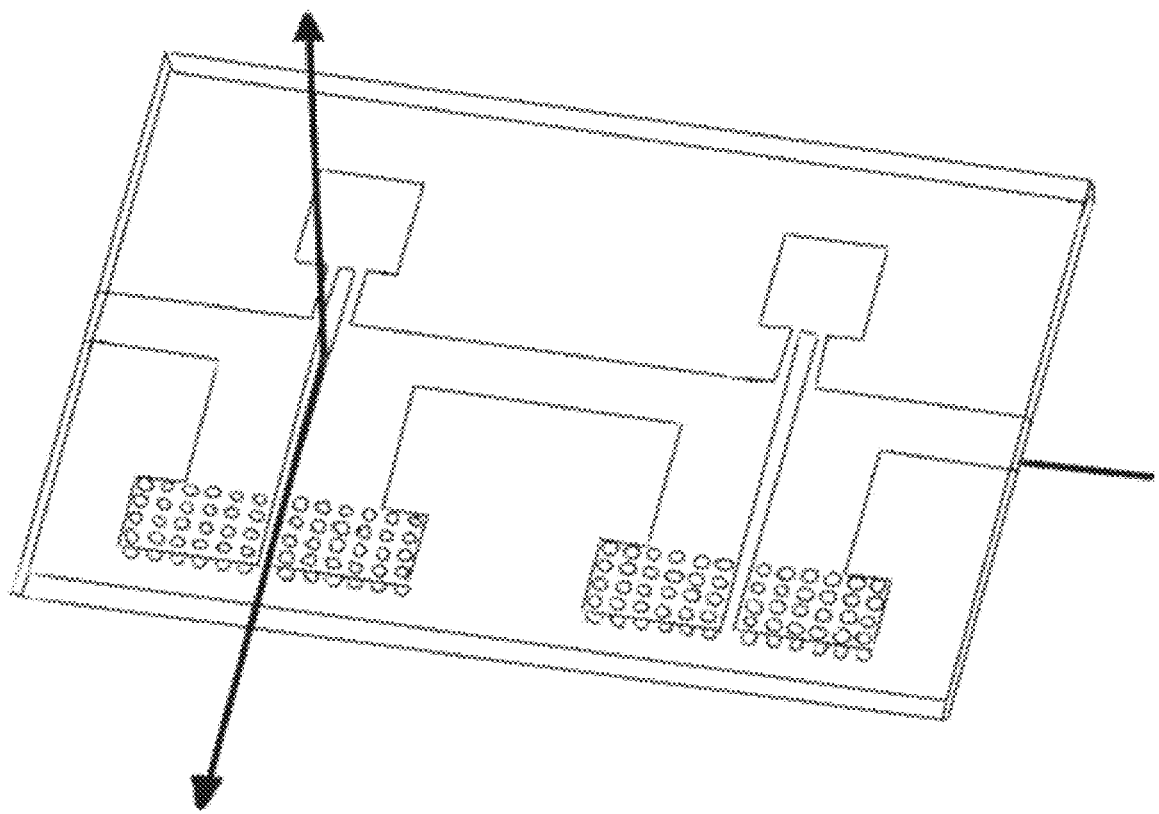
FIG. 12 is a structural block diagram of a transceiver antenna using a cascaded higher-harmonic suppression filter according to an embodiment of the present disclosure.

In a second embodiment, a layout structure of the board 3 of the transceiver antenna adopts an optimized design of a higher-harmonic suppression filter. FIG. 11 shows a structure of a single filter, and an external size of the filter is 30 mm*20 mm A size parameter and a dielectric plate parameter of the filter keep unchanged, and two harmonic suppression filters are cascaded. FIG. 12 shows a structure of a cascaded filter.

Figure 13:
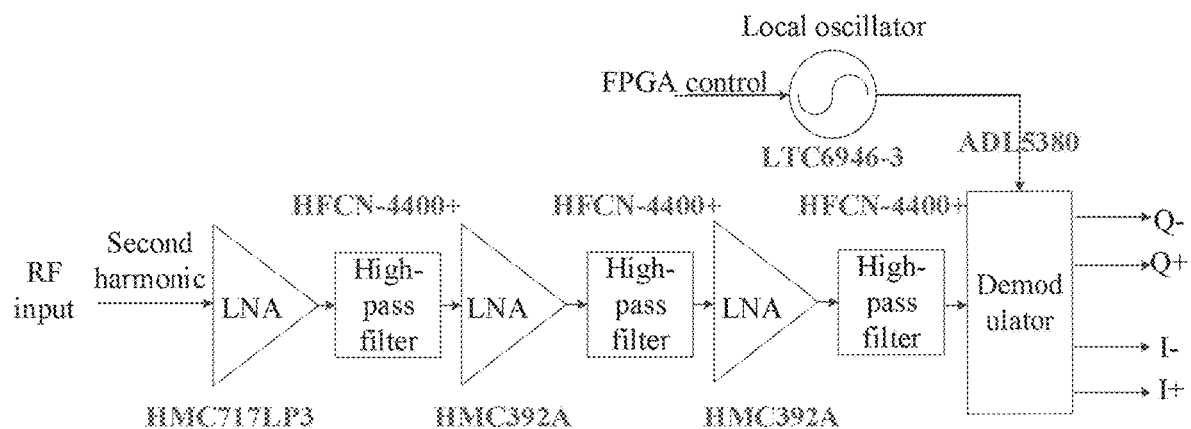
FIG. 13 is a block diagram illustrating a design of a second-harmonic receiver according to the present disclosure.

As shown in FIG. 13, the second-harmonic receiver includes an RF amplification circuit and a demodulation circuit.

The RF amplification circuit adopts a design of cascading three-stage amplifiers, to avoid self-oscillation of the amplifier. A first-stage chip at a receiving end of the second-harmonic receiver is a low-noise amplifier with a high gain and a low noise coefficient. An HMC717LP3 produced by ADI is preferred, with a noise coefficient of 1.1 dB and an operating frequency range of 4.6 GHz to 6.0 GHz. Second-stage and third-stage chips at the receiving end of the second-harmonic receiver have a small impact on a channel noise coefficient, and primarily need to pay attention to a gain. An RF LNA amplifier HMC392A is preferred, with an operating frequency range being 3.5 GHz to 7.0 GHz, the gain being 17.4 dB, the noise coefficient being 1.7 dB, the P1 dB being 19 dBm, and the OIP3 being 34.5 dBm. A three-stage series design is adopted, and a theoretical gain can reach 49.8 dB.

Figure 14:
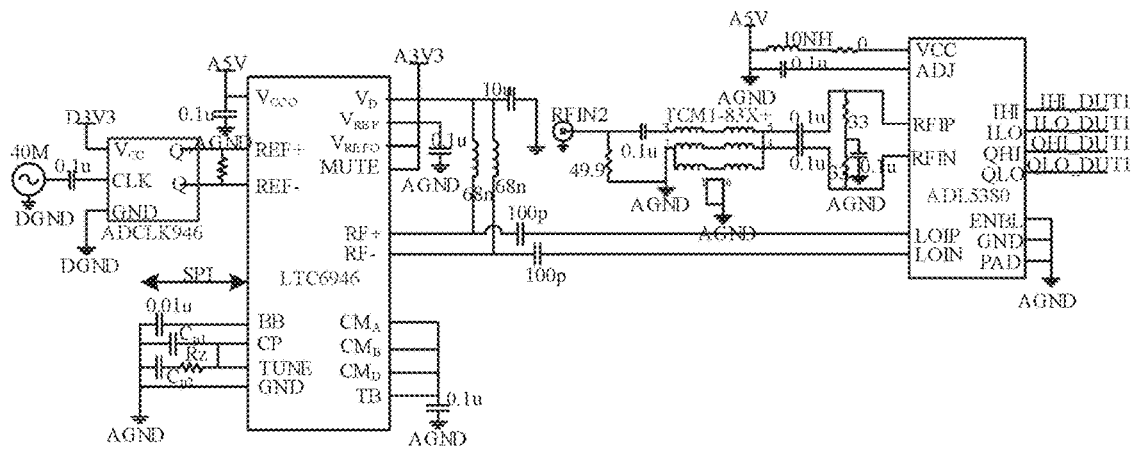
FIG. 14 is a principle diagram of a modulation circuit of a second-harmonic receiver according to the present disclosure.

The demodulation circuit is used to mix an RF echo signal and a local higher-harmonic signal to obtain an IF echo signal for next-stage data amplification and quantification. FIG. 14 is a principle diagram of a modulation circuit. The demodulator needs to have high demodulation precision and a low noise coefficient. The ADL5380 of ADI is preferred, which supports RF and local oscillator input frequency ranges of 400 MHz to 6000 MHz, a demodulation bandwidth of up to 390 MHz, a demodulation phase precision of about 0.2°, and an amplitude balance of about 0.07 dB. The local oscillator in the demodulation circuit meets requirements for low harmonic distortion, low phase noise, high output power, and the like. The LTC6946 is preferred. A signal input of a demodulation chip is in a differential form. It is necessary to conduct single-ended-to-differential conversion for a harmonic echo signal obtained after RF amplification. In a circuit design, an RF converter TCM1_83X+ produced by Mini-Circuits is preferred to complete conversion. The TCM1_83X+ supports a signal input of 10 MHz to 8000 MHz and provides 50Ω impedance matching. An insertion loss at a corresponding frequency of the second harmonic is about 1 dB.

Figure 15:
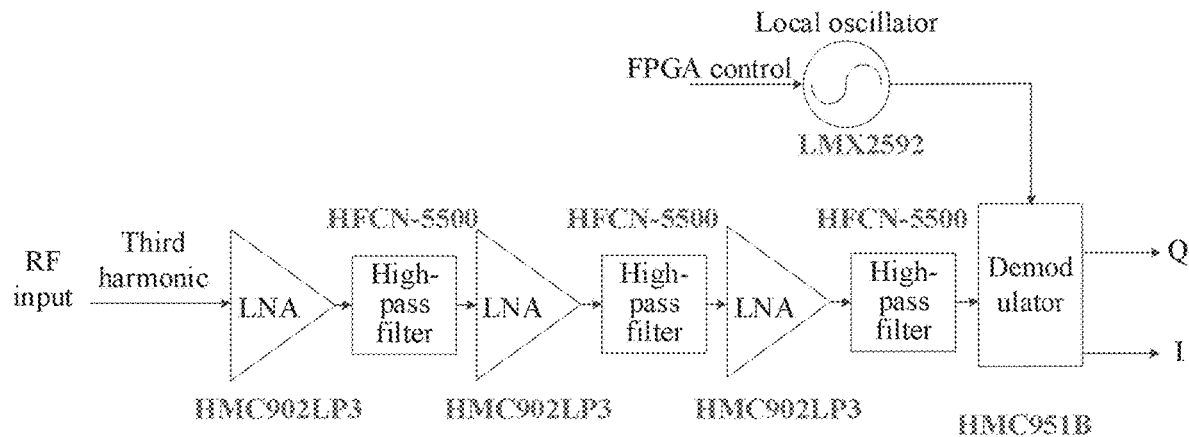
FIG. 15 is a block diagram illustrating a design of a third-harmonic receiver according to the present disclosure.

As shown in FIG. 15, the third-harmonic receiver has a receiving frequency range of 7212 MHz to 7416 MHz, and a third-harmonic echo bandwidth is broadened to 4.5 MHz. Hardware of the third-harmonic receiver includes an RF amplification circuit and a demodulation circuit.

The RF amplification circuit adopts a design of cascading three-stage amplifiers, to avoid self-oscillation of the amplifier. A first-stage chip at a receiving end of the third-harmonic receiver is a low-noise amplifier with a high gain and a low noise coefficient. An HMC902LP3 produced by ADI is preferred, with the noise coefficient being 1.1 dB, the operating frequency range being 5 GHz to 11 GHz, a gain at a third-harmonic frequency being about 19.5 dB, the P1 dB being 16 dBm, and the OIP3 being 28 dBm. Second-stage and third-stage chips at the receiving end of the third-harmonic receiver need to provide a relatively large gain. The HMC902LP is preferred, with the noise coefficient being 1.1 dB, the operating frequency range being 5 GHz to 11 GHz, the gain at the third-harmonic frequency being about 19.5 dB, the P1 dB being 16 dBm, and the OIP3 being 28 dBm.

The demodulation circuit is used to mix an RF echo signal and a local higher-harmonic signal to obtain an IF echo signal for next-stage data amplification and quantification. The demodulator needs to have high demodulation precision and a low noise coefficient. The HMC951B of ADI is preferred, with an RF input range of 5.6 GHz to 8.6 GHz, a local oscillator input range of 4.5 GHz to 12.1 GHz, a demodulation phase precision of 3°, and an amplitude balance of about 0.5 dB.

The local oscillator in the demodulation circuit needs to meet requirements for low harmonic distortion, low phase noise, high output power, and the like. A high-performance broadband RF synthesizer LMX2592 provided by TI is preferred, which internally integrates a voltage controlled oscillator (VCO) and supports fractional N and integer N modes. An output frequency range may reach 20 MHz to 9800 MHz, and integral noise is 49 fs. The chip supports double differential outputs, and output power is 8 dBm. A phase, a charge pump current, and the output power can be adjusted by using a reserved SPI.

The RF power supply supplies power to discrete modules of the RF transmitter, the second-harmonic receiver, and the third-harmonic receiver.

Specifically, in an RF circuit, the modulator, the local oscillator, and the power amplifier of a transmitting channel, and the demodulator, the local oscillator, and the low-noise amplifier of a secondary receiving channel all need to be powered by a 5V power supply. Local oscillator chips of the transmitting and secondary receiving channels need to be powered by a 3.3 V power supply. The demodulator, the local oscillator, and the low-noise amplifier chip of the tertiary receiving channel need to be powered by a 3.5 V power supply. The whole RF circuit has a high requirement for a power supply current, with a required current not less than 550 mA for the 3.3 V power supply, not less than 530 mA for the 3.5 V power supply, and not less than 1500 mA for the 5 V power supply. The RF power supply system is an RF circuit power system separately designed by using a linear regulator. The linear voltage regulator is preferably a 3A low-dropout positive-adjustable high-efficiency linear voltage regulator LT1085 produced by Linear. A linearity can reach 0.2% when the chip is loaded. The LT1085 has a maximum input voltage of 30 V and an adjustable output voltage, and supports a maximum current output of 3 A.

The user display module receives data processed by the signal processing module, and displays spectrums of the received second-harmonic signal and the third-harmonic signal.

The target identification module uses a deep learning technology to build an ANN, and uses the accumulation method based on the frequency-domain feature to learn the feature of the audio signal database collected by the harmonic radar, generates the classification model, establishes an artificial intelligent classification system, and completes classification and identification of a harmonic radar target.

The harmonic radar can detect and identify a plurality of targets of different types such as a semiconductor, a metallic contact, a wall-mounted switch, wall-mounted socket, a network port, a mouse, an integrated circuit board, a lithium battery, a power adapter, and a professional device.

Figure 16:
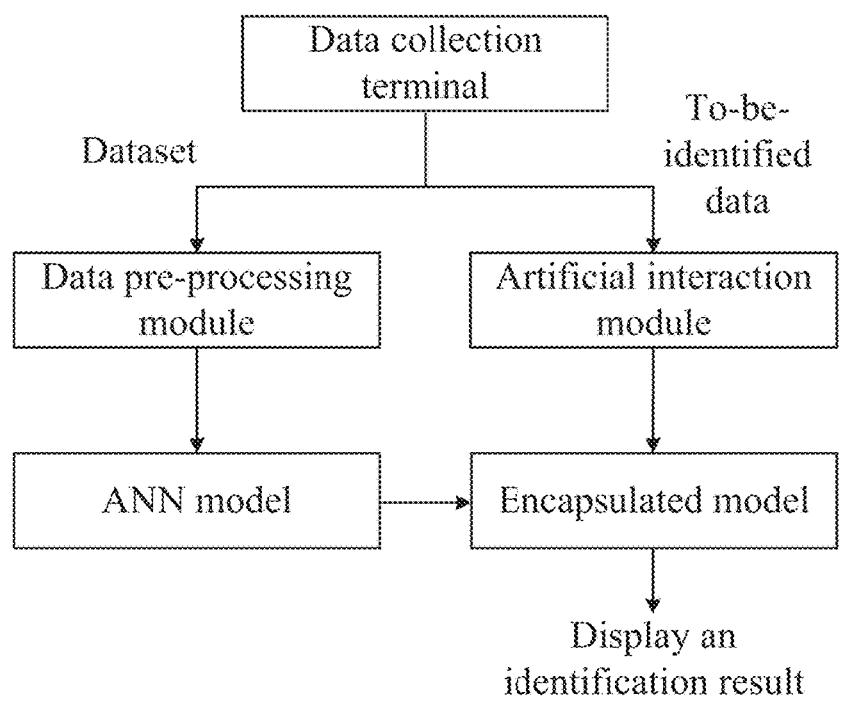
FIG. 16 is a block diagram illustrating modules of a target identification system according to the present disclosure.

As shown in FIG. 16, the target identification module specifically includes a data collection terminal, a data pre-processing module, an ANN model, an artificial interaction module, and an encapsulation module.

The data collection terminal collects target signal data and inputs it to the data pre-processing module for data clipping and alignment operations, and then imports pre-processed training set data into the ANN model, and extracts a data feature for deep learning and training. After encapsulation by an encapsulated model, when a single signal needs to be identified, the artificial interaction module imports to-be-identified data, loads a trained encapsulated model, analyzes and compares a feature of the to-be-identified data, and obtains a prediction result. So far, the single signal is identified and classified.

The data collection terminal is connected to output ports of the second-harmonic receiver and the third-harmonic receiver. The data pre-processing module performs batch processing, clipping, and alignment operations on training set data and test set data. The ANN model is responsible for extracting a feature from the training set data, and performing deep learning and training. The CNN is preferably selected to extract a spectrogram feature of the data, segment the spectrogram feature based on a time-frequency-energy sequence to form spectrogram segments of a same length. Then, acoustic spectrum features of targets of a same type are accumulated and imported into a CNN model for training. After a certain quantity of iterations, an optimal parameter configuration of the neural network is obtained, and the model is encapsulated under the optimal parameter configuration. The artificial interaction module is responsible for displaying an atlas feature of the to-be-identified data, calling the encapsulated model, performing feature identification, completing target classification, and finally displaying an obtained target classification and identification result.

Figure 19:
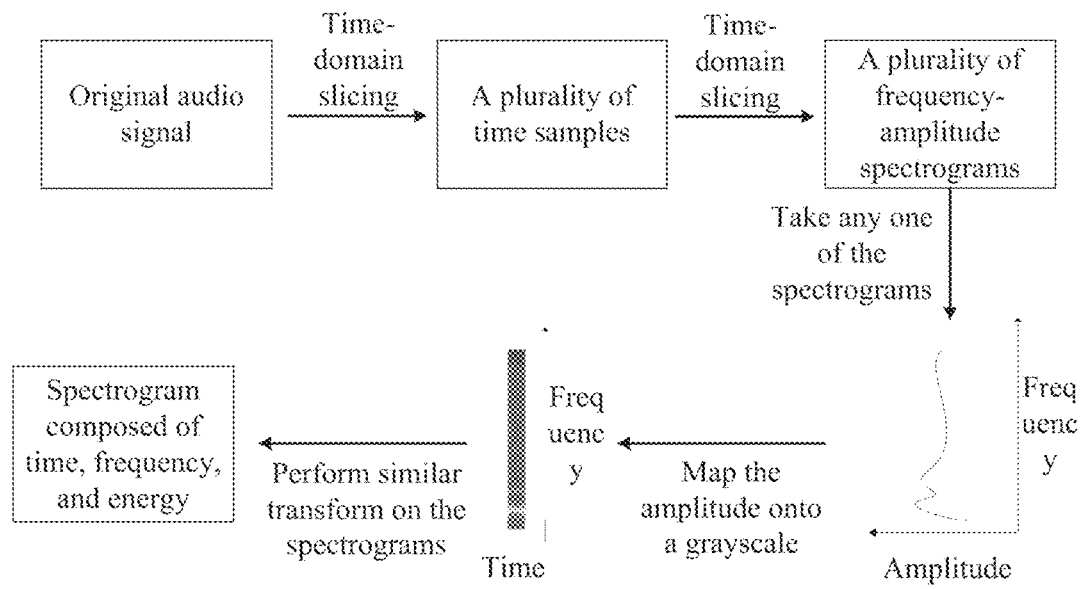
FIG. 19 is a schematic flowchart of converting an audio signal to a spectrogram according to the present disclosure.
Figure 20A:
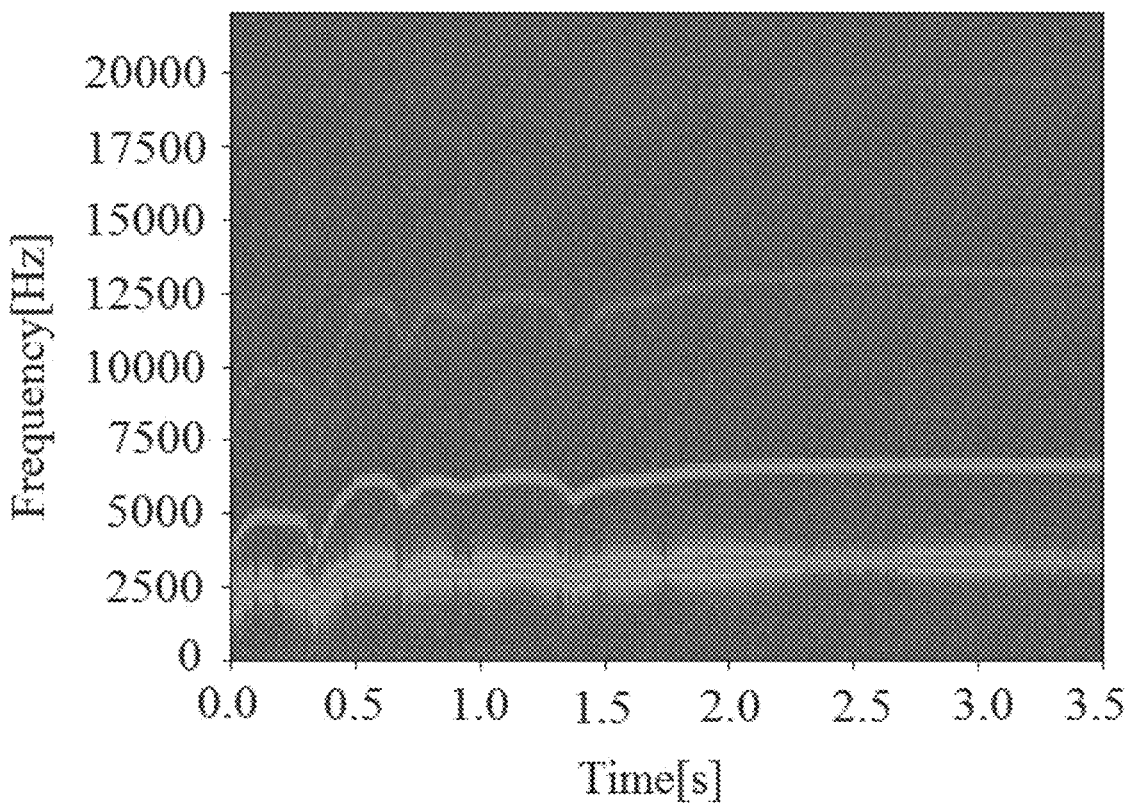
FIG. 20A shows a spectrogram of a semiconductor detected by a harmonic radar according to the present disclosure.
Figure 20B:
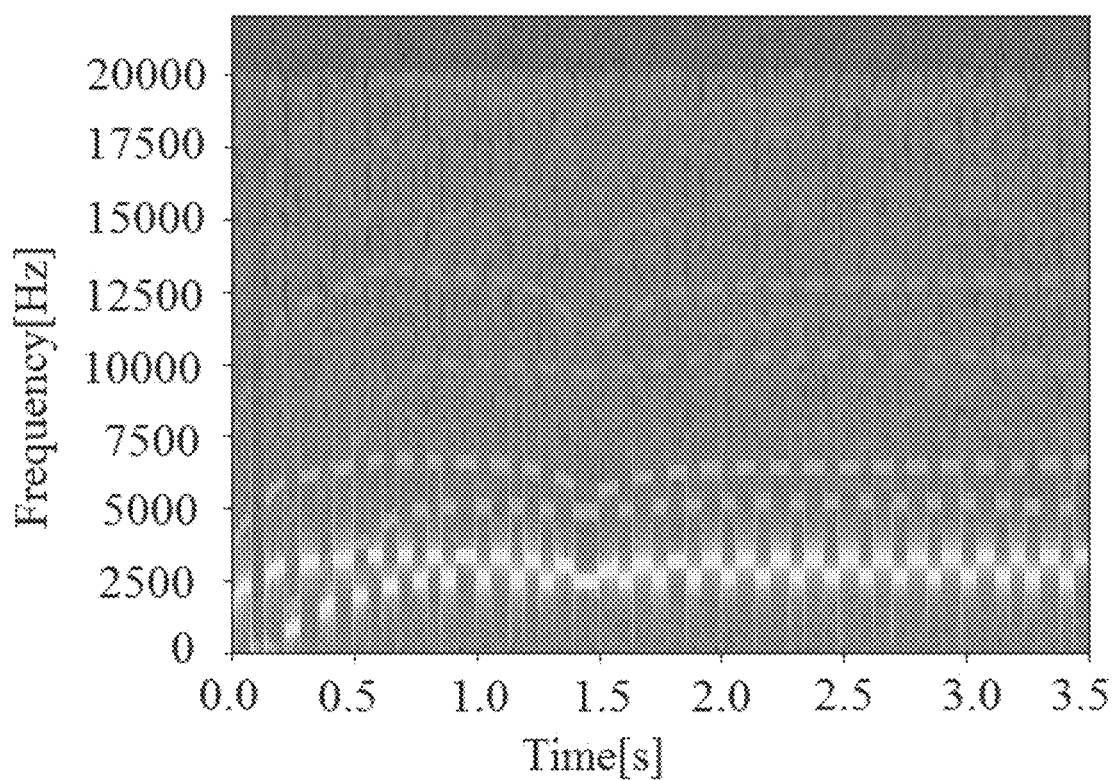
FIG. 20B shows a spectrogram of a metallic contact detected by a harmonic radar according to the present disclosure.
Figure 20C:
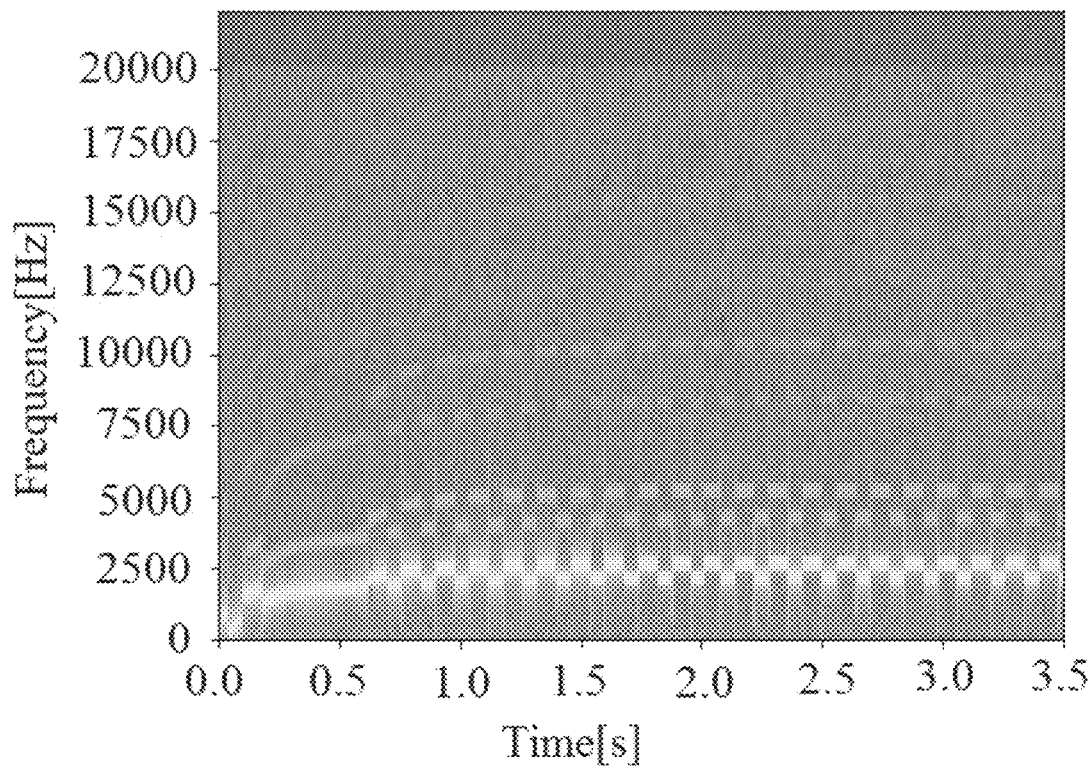
FIG. 20C shows a spectrogram of a wall-mounted switch detected by a harmonic radar according to the present disclosure.
Figure 20D:
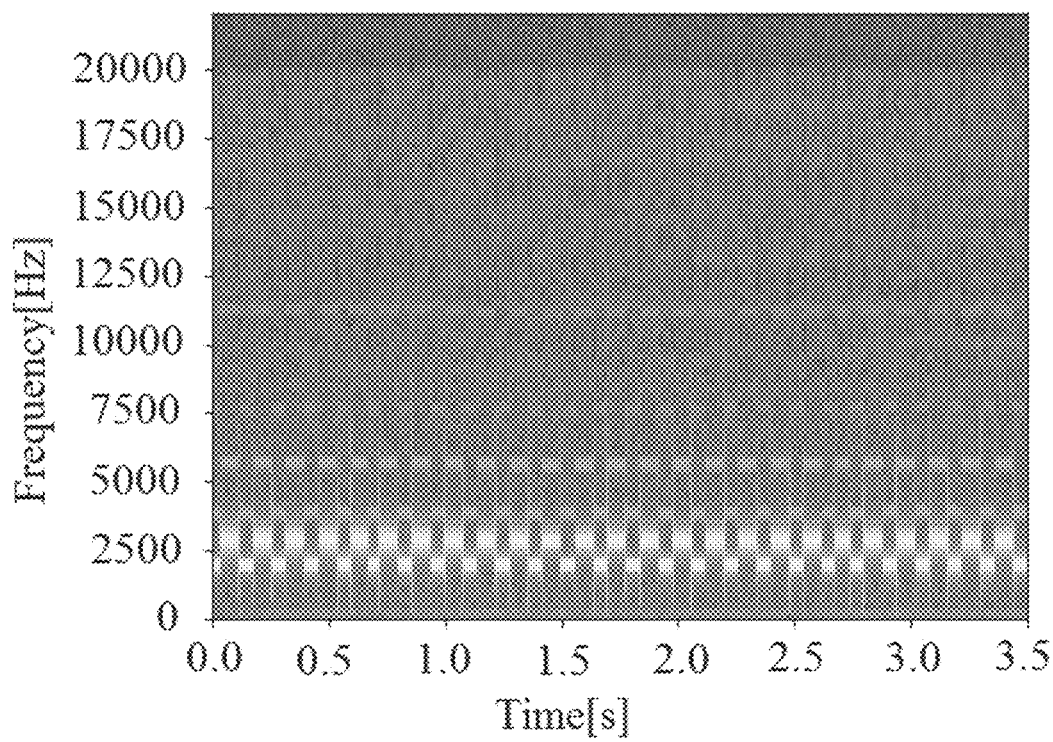
FIG. 20D shows a spectrogram of a wall-mounted socket detected by a harmonic radar according to the present disclosure.
Figure 20E:
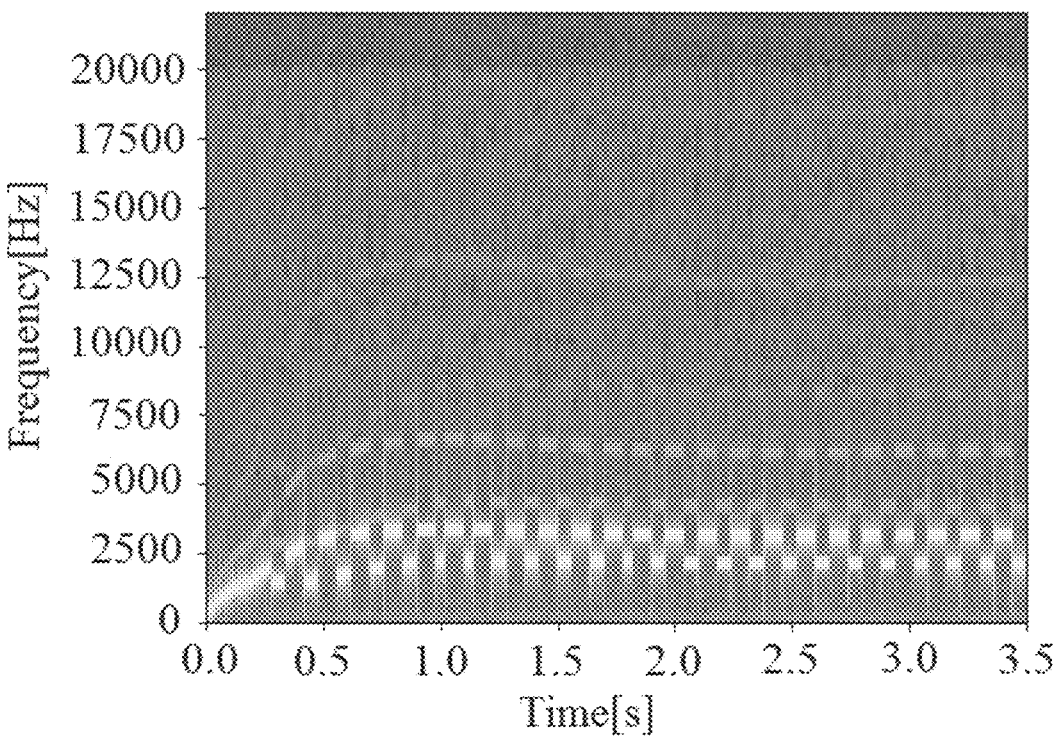
FIG. 20E shows a spectrogram of a network port detected by a harmonic radar according to the present disclosure.
Figure 20F:
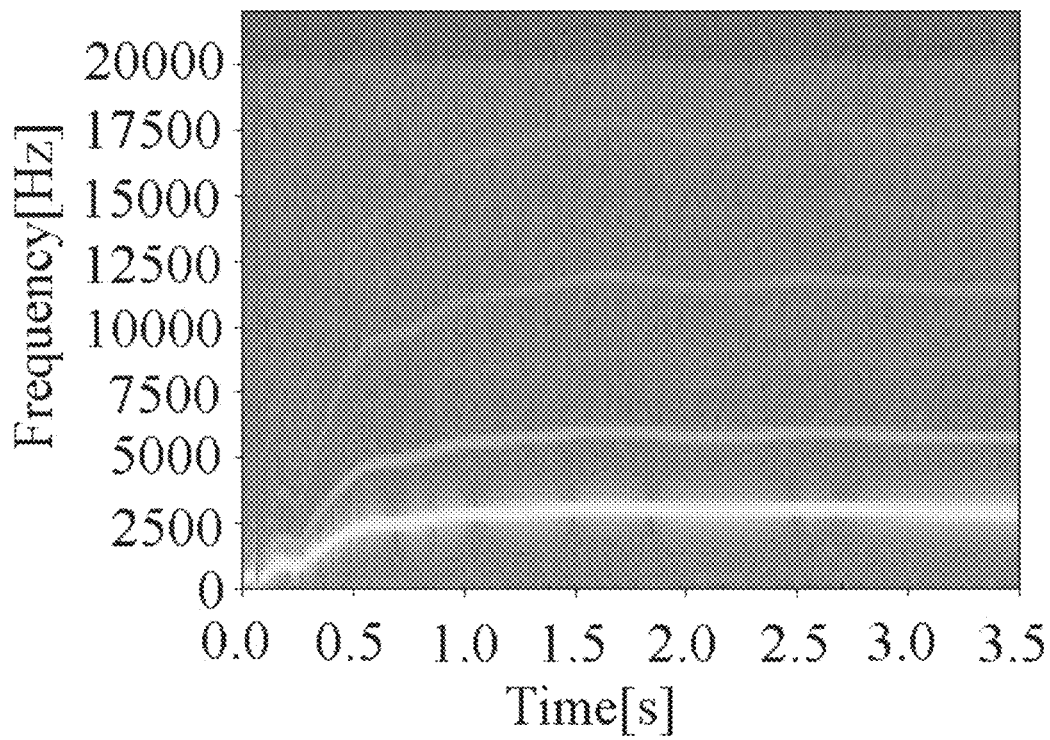
FIG. 20F shows a spectrogram of a mouse detected by a harmonic radar according to the present disclosure.
Figure 20G:
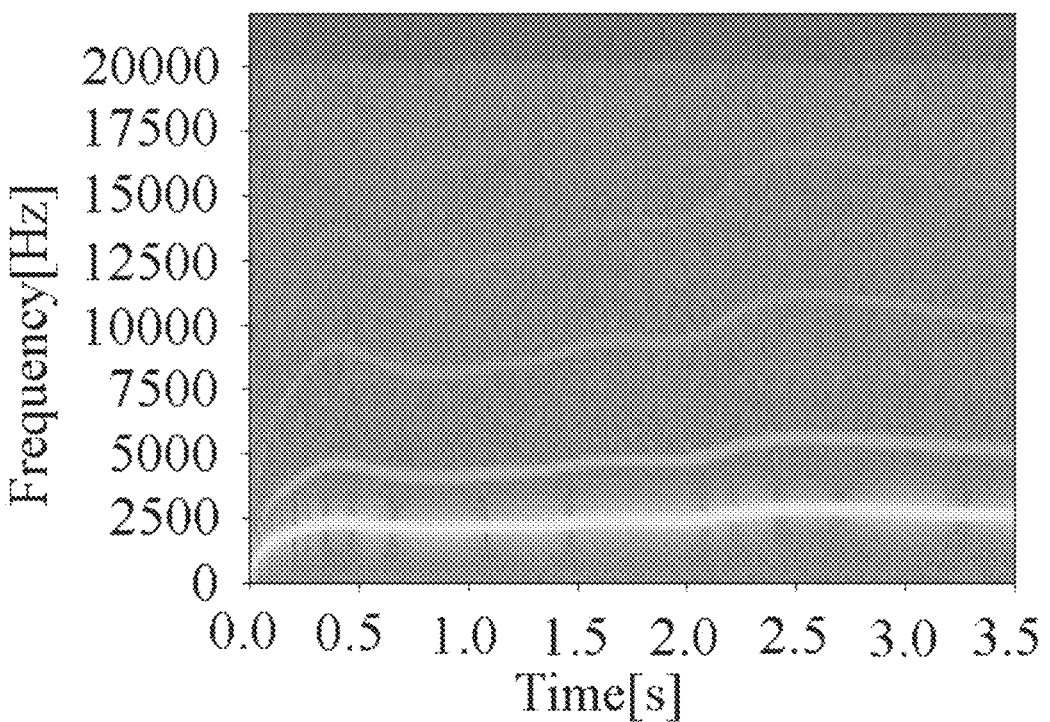
FIG. 20G shows a spectrogram of an integrated circuit board detected by a harmonic radar according to the present disclosure.
Figure 20H:
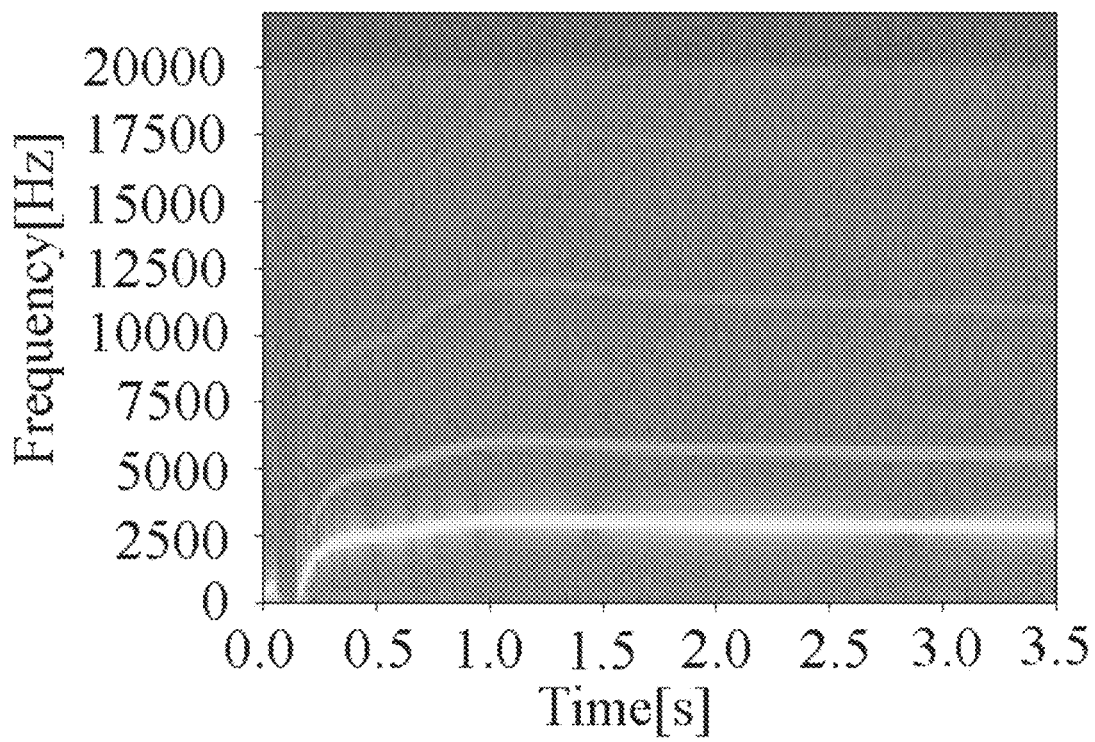
FIG. 20H shows a spectrogram of a lithium battery detected by a harmonic radar according to the present disclosure.
Figure 20I:
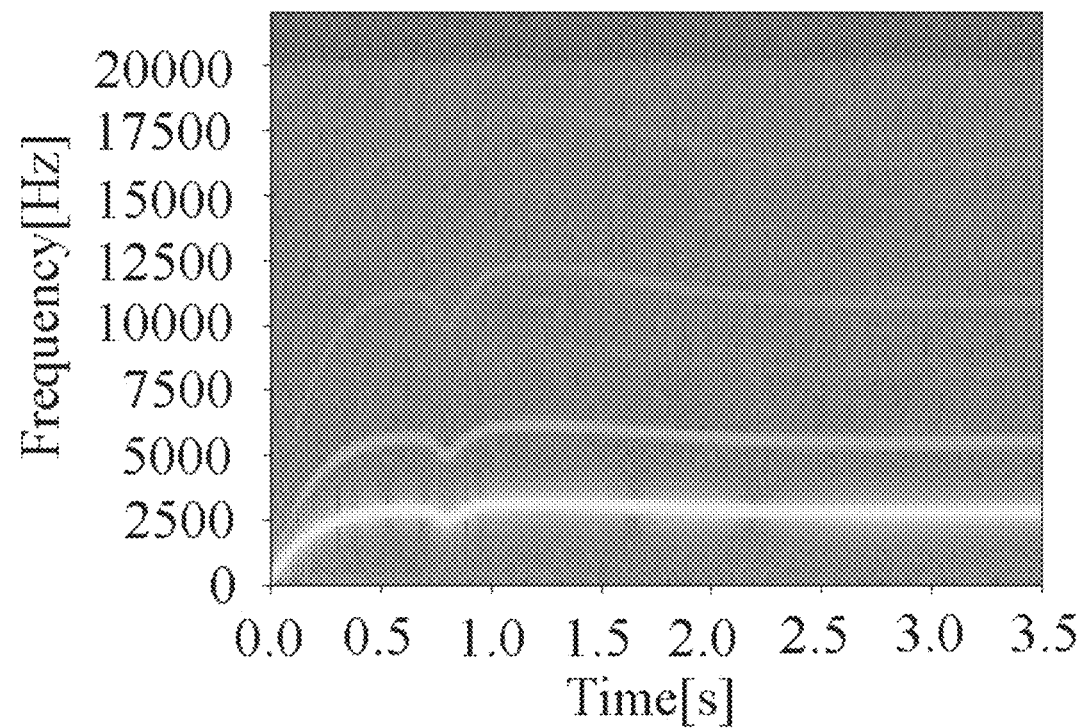
FIG. 20I shows a spectrogram of a power adapter detected by a harmonic radar according to the present disclosure.
Figure 20J:
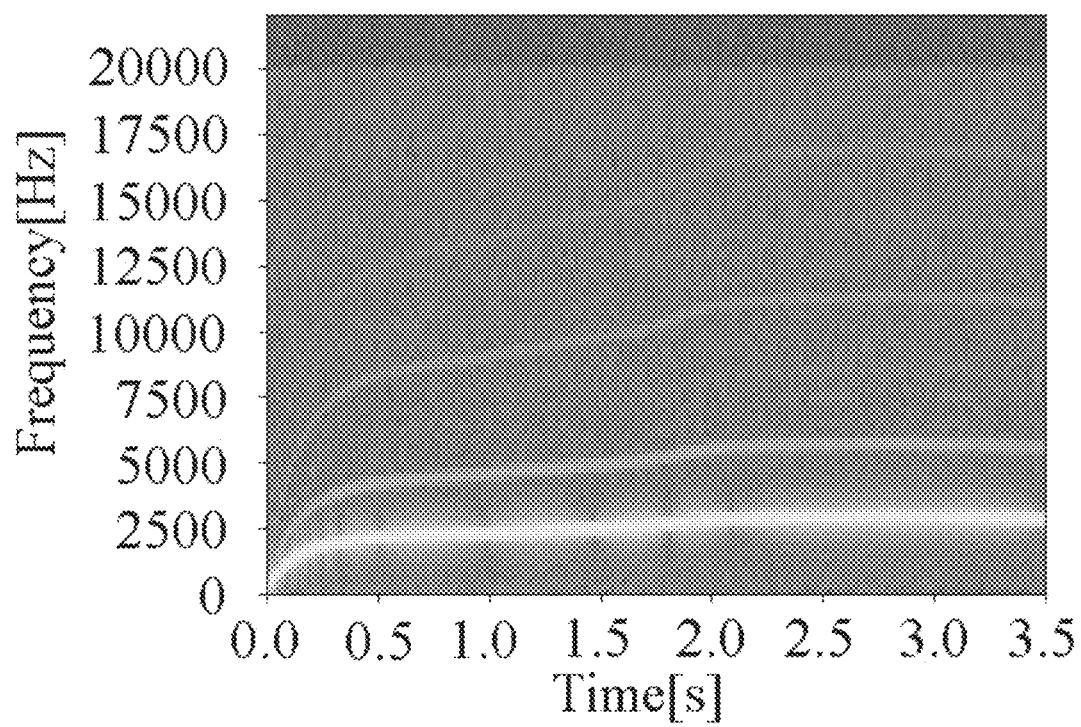
FIG. 20J shows a spectrogram of a professional device detected by a harmonic radar according to the present disclosure.

A specific identification and classification process is as follows:

First, Fast Fourier Transform (FFT) is performed on collected audio signal samples of different target echoes to obtain a spectrogram composed of time, frequency and energy information. Various target audio signal forms are shown in FIG. 18A-J below. A process for converting an audio signal to a spectrogram is shown in FIG. 19 below. For different types of targets detected by the harmonic radar, obtained spectrograms are also different. For audio signals of the semiconductor, the metallic contact, the wall-mounted switch, wall-mounted socket, the network port, the mouse, the integrated circuit board, the lithium battery, the power adapter, and the professional device, forms of spectrograms obtained after conversion are shown in FIG. 20A-J below. An abscissa represents time, an ordinate represents a frequency, and a value of a coordinate point represents audio data energy. Because the atlas uses a two-dimensional plane to express three-dimensional information, an energy size of a frequency at corresponding time is expressed by pixel intensity (namely, a grayscale value or a color gradient range). A larger grayscale value (a darker color) leads to greater energy; a smaller grayscale value (a lighter color) leads to smaller energy.

Figure 17:
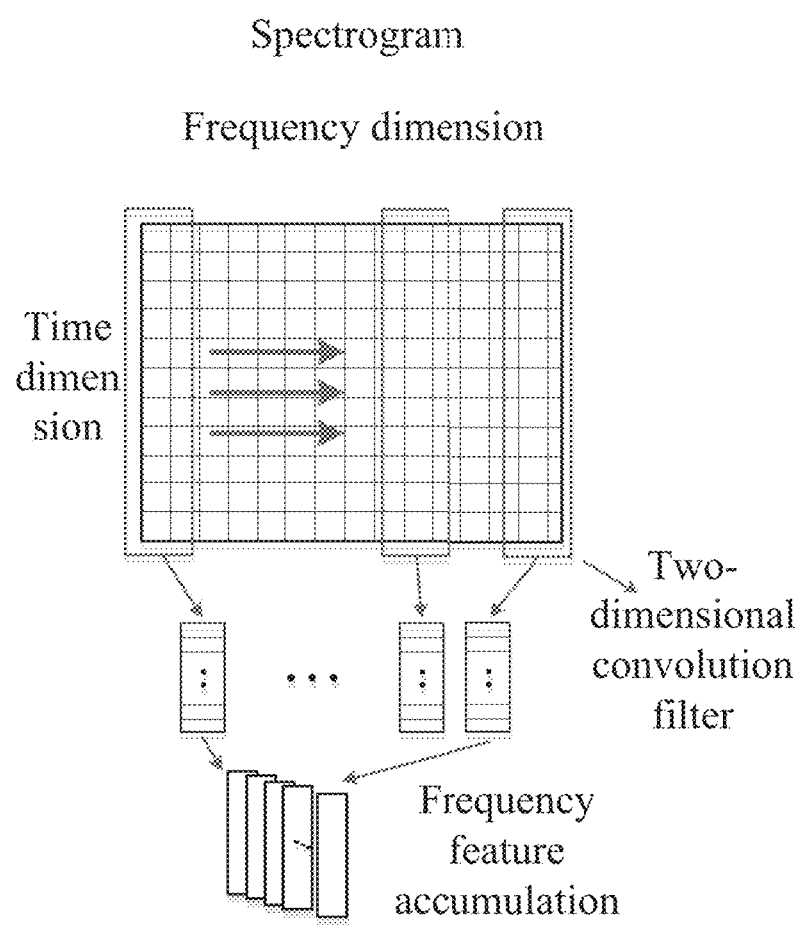
FIG. 17 shows an extraction and accumulation process of a frequency characteristic of a spectrogram according to the present disclosure.
Figure 18A:
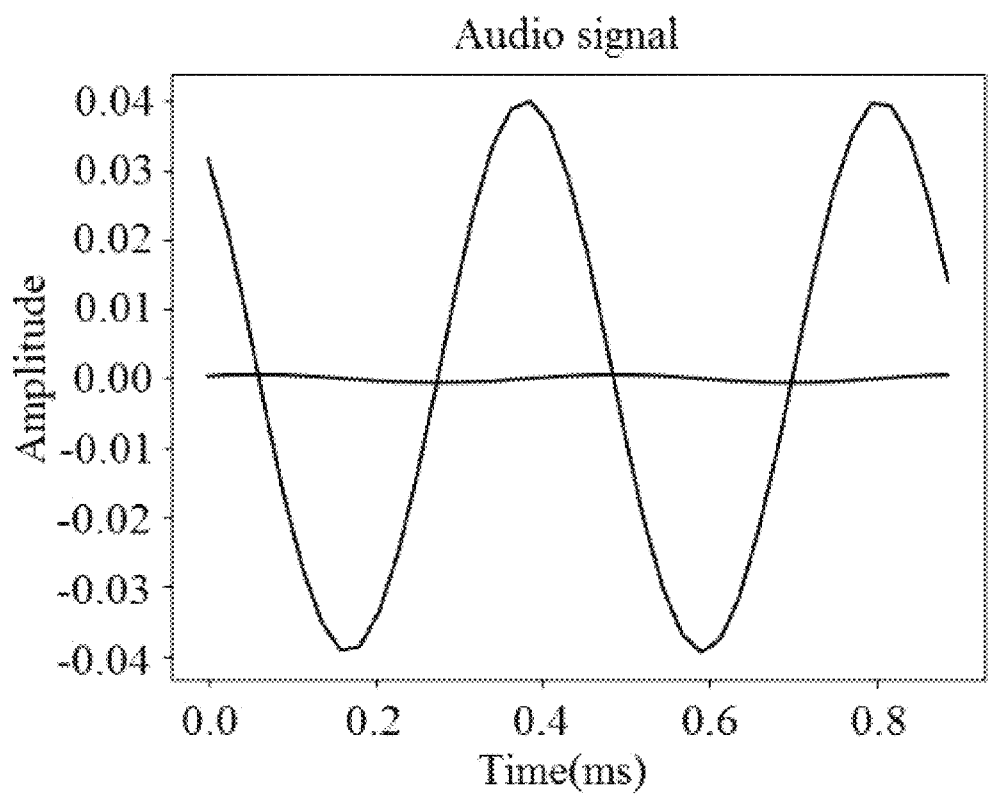
FIG. 18A shows a form of audio signal of a semiconductor according to the present disclosure.
Figure 18B:
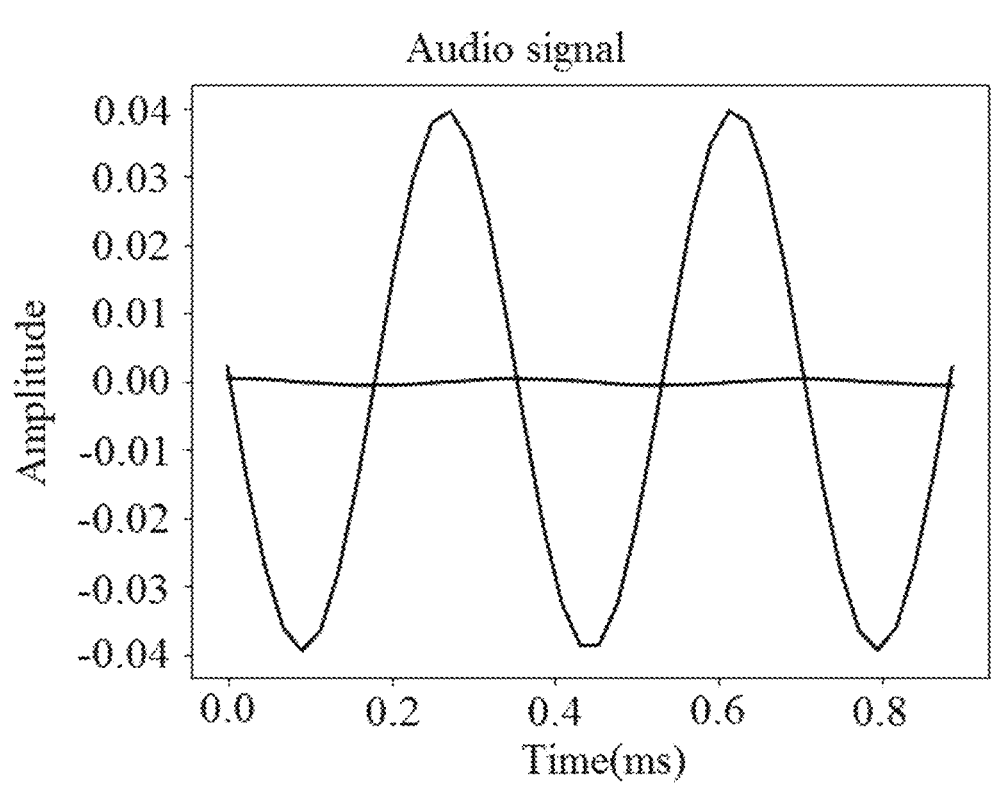
FIG. 18B shows a form of audio signal of a metallic contact according to the present disclosure.
Figure 18C:
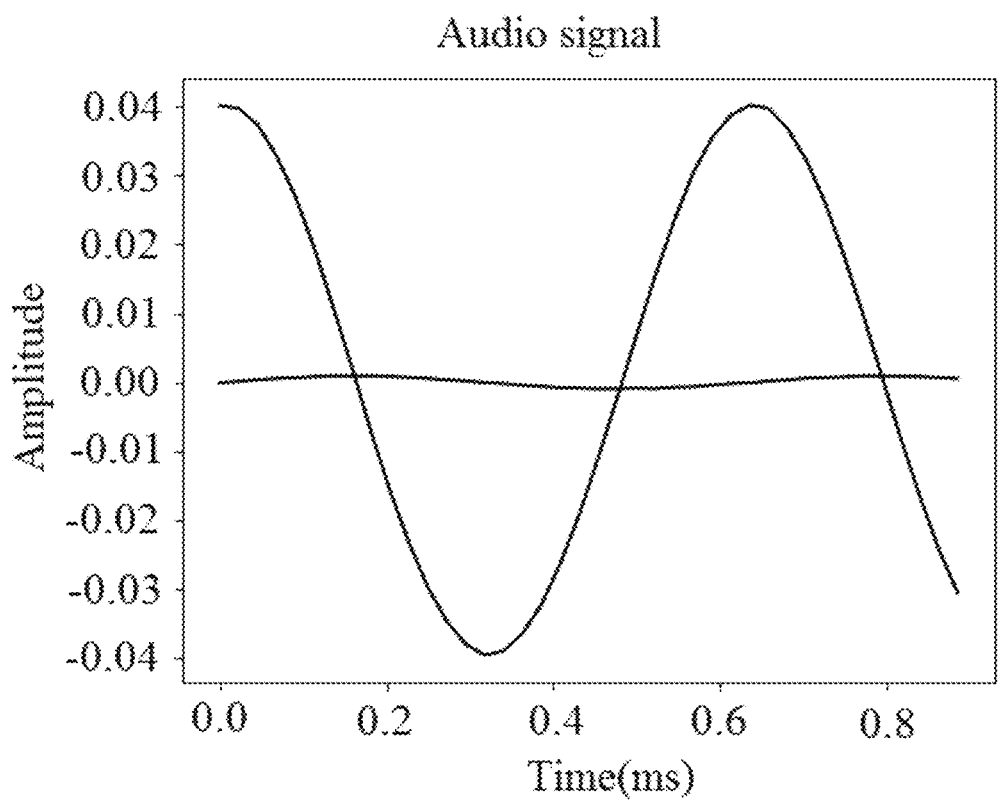
FIG. 18C shows a form of audio signal of a wall-mounted switch according to the present disclosure.
Figure 18D:
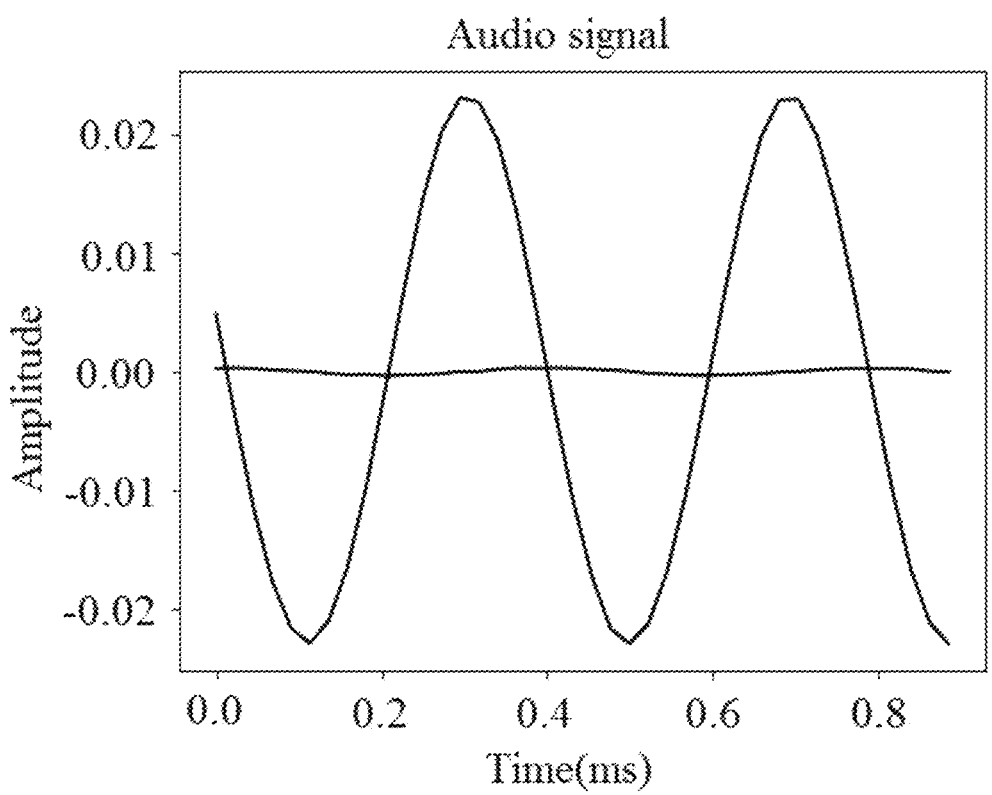
FIG. 18D shows a form of audio signal of a wall-mounted socket according to the present disclosure.
Figure 18E:
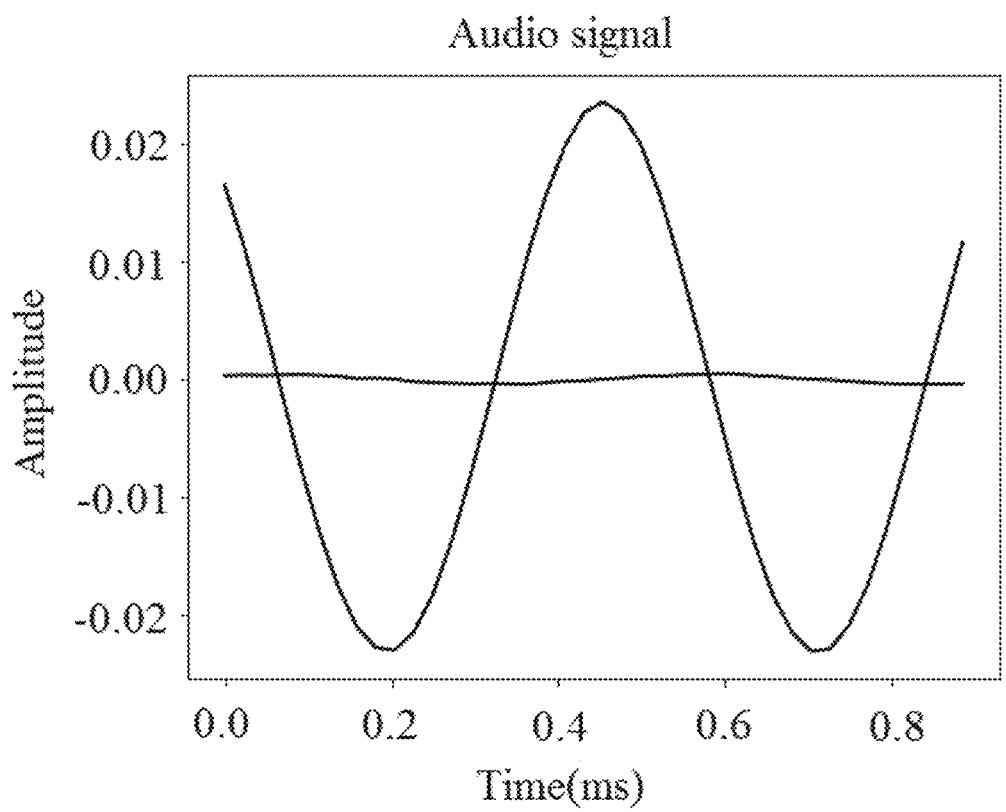
FIG. 18E shows a form of audio signal of a network port according to the present disclosure.
Figure 18F:
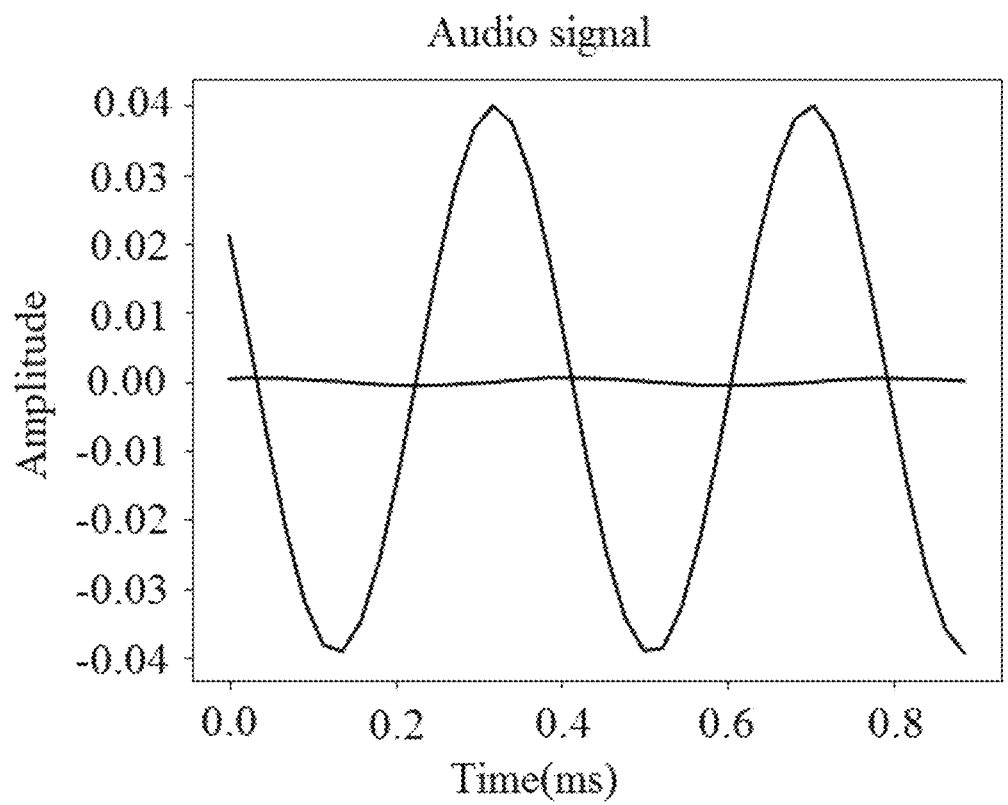
FIG. 18F shows a form of audio signal of a mouse according to the present disclosure.
Figure 18G:
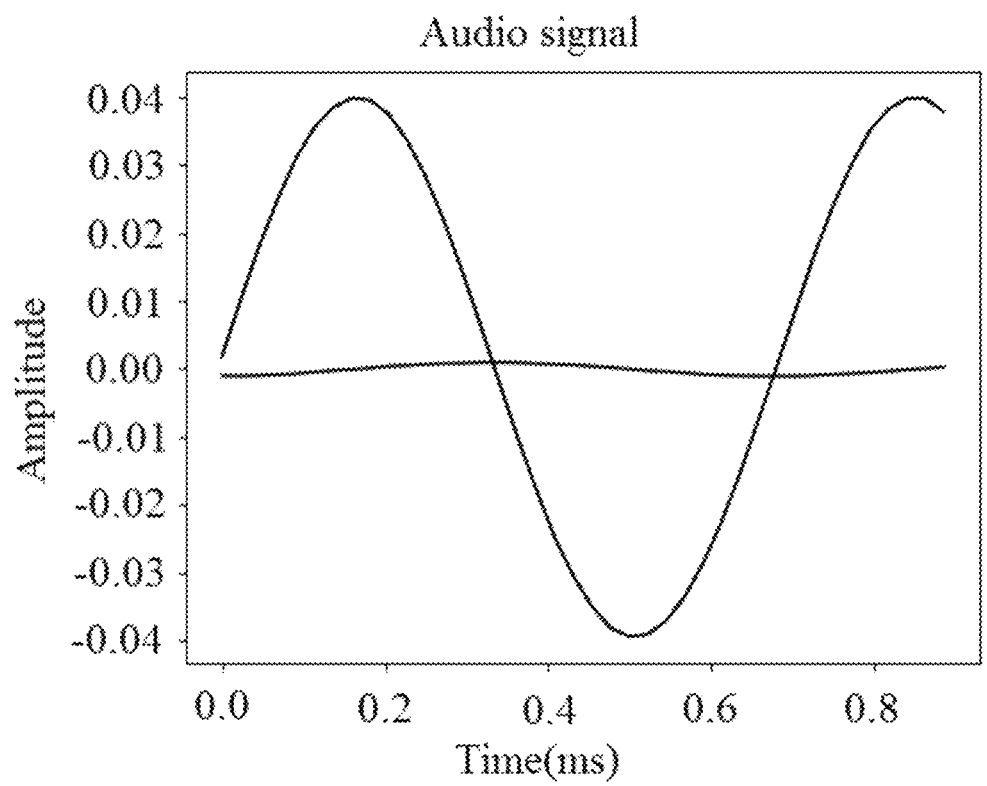
FIG. 18G shows a form of audio signal of an integrated circuit board according to the present disclosure.
Figure 18H:
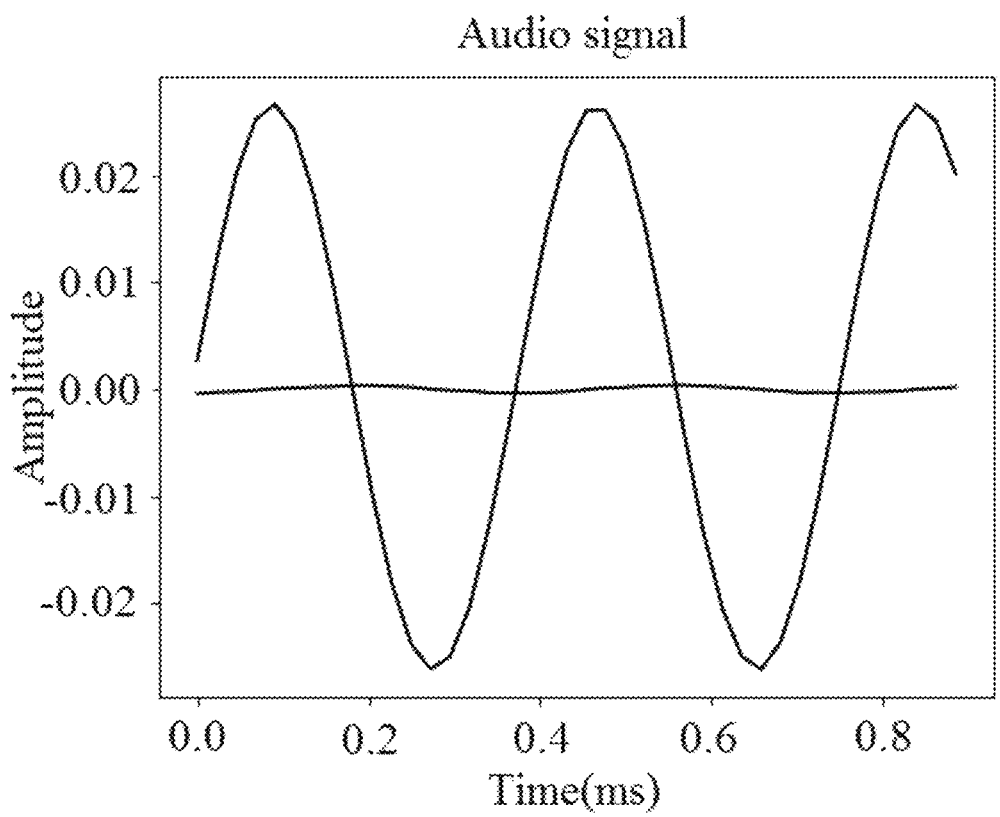
FIG. 18H shows a form of audio signal of a lithium battery according to the present disclosure.
Figure 18I:
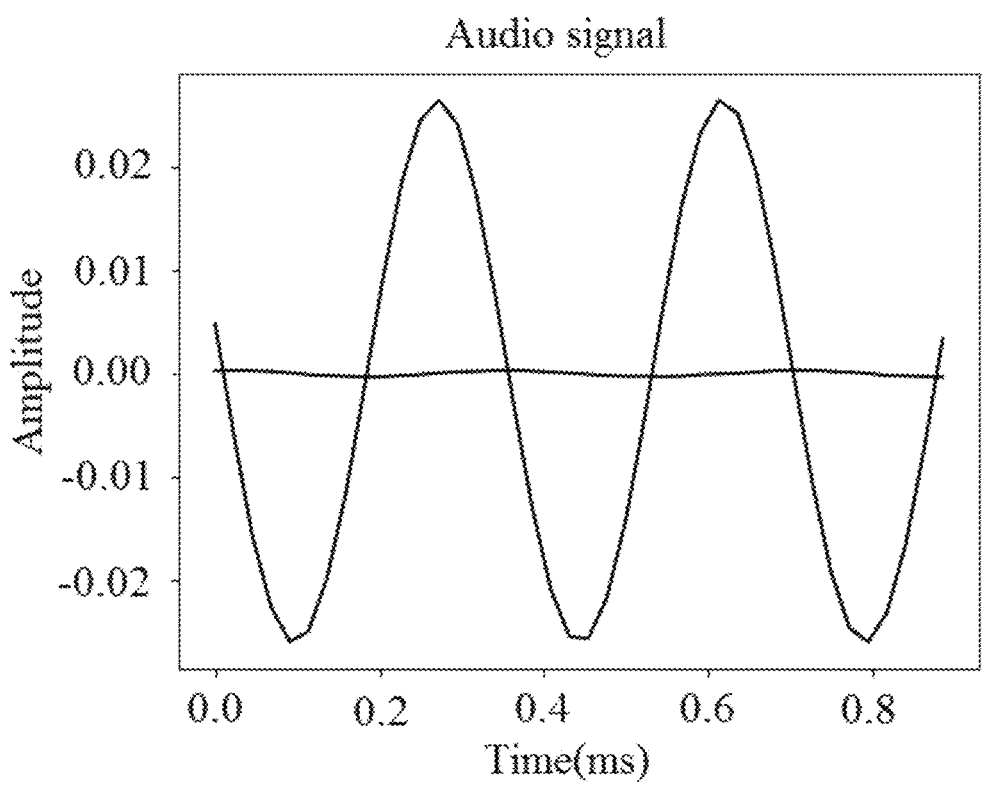
FIG. 18I shows a form of audio signal of a power adapter according to the present disclosure.
Figure 18J:
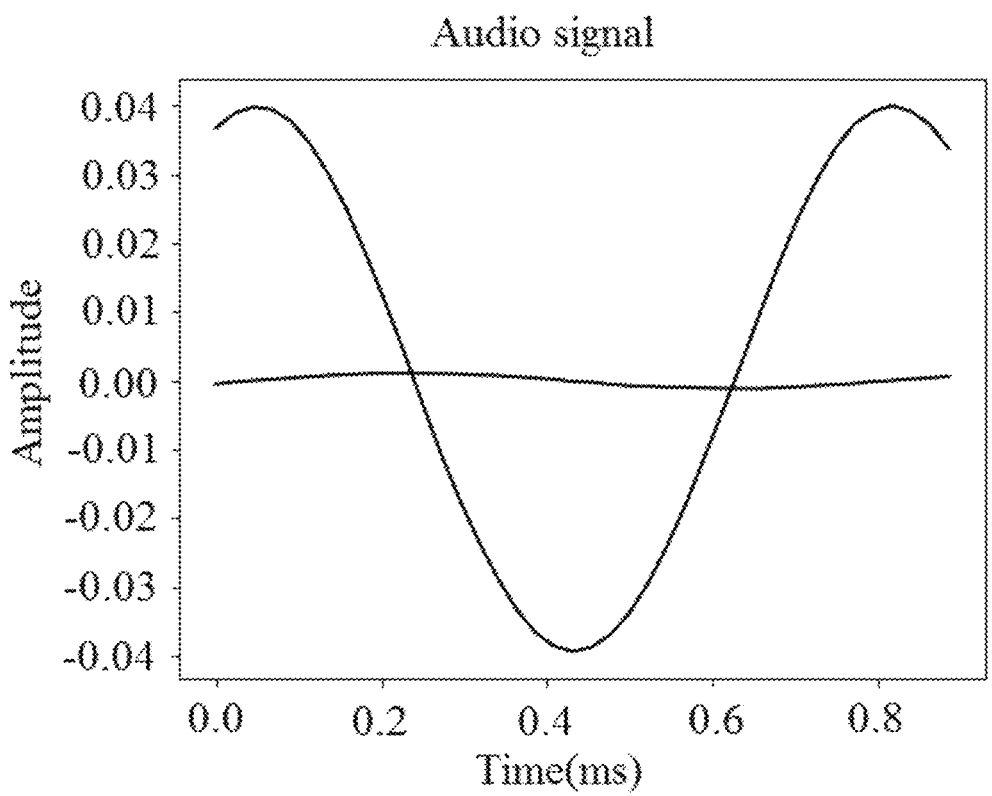
FIG. 18J shows a form of audio signal of a professional device according to the present disclosure.
Figure 21:
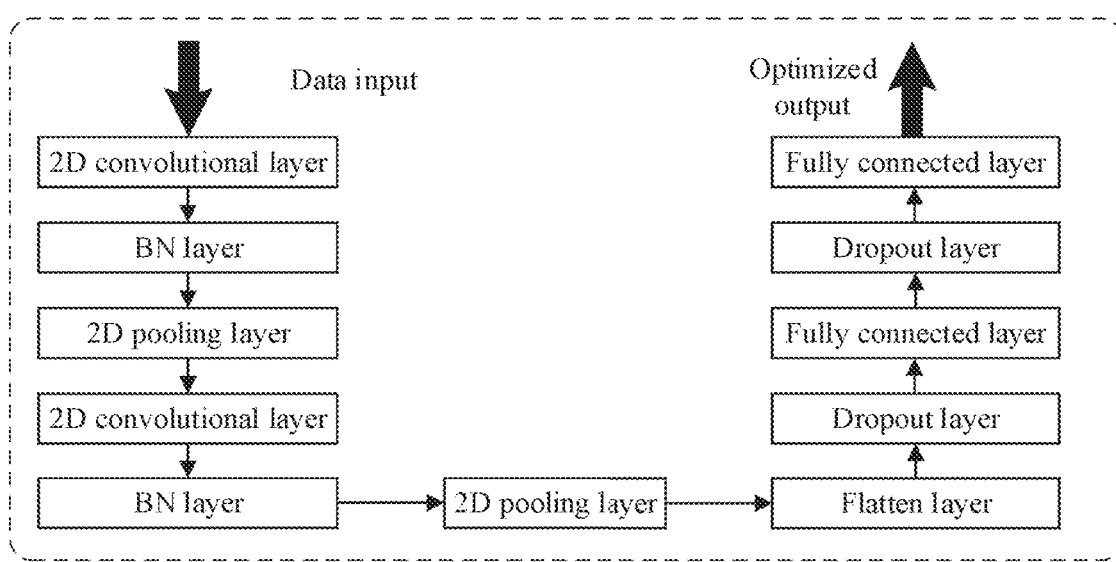
FIG. 21 is a schematic architectural diagram of a CNN used in the present disclosure.
Figure 22:
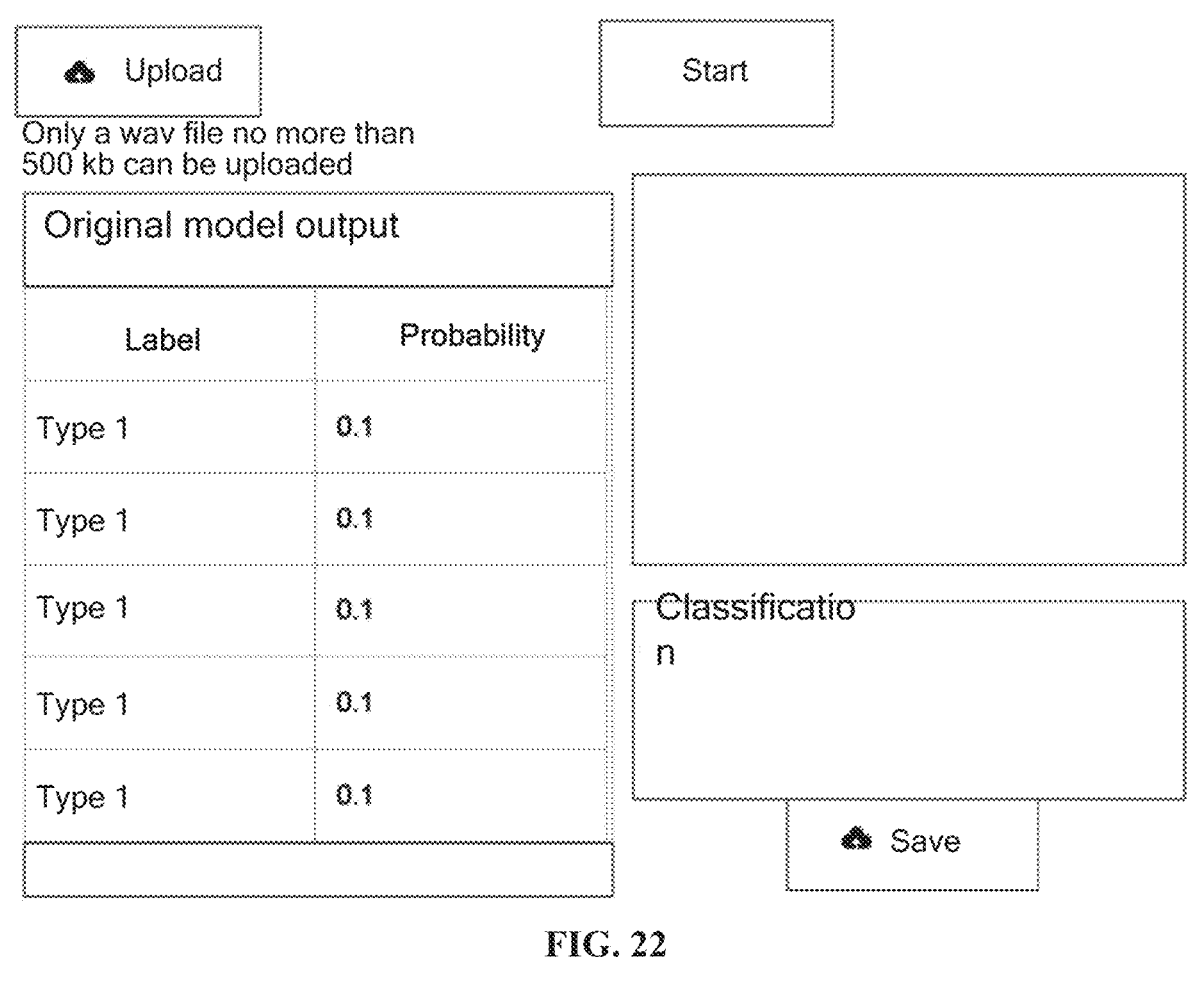

For audio signal spectrograms of different types of targets, their voiceprint features are different. In addition, frequency resolution in the spectrogram is higher than time resolution, and higher energy is displayed near a certain specific frequency. Therefore, the data feature is accumulated based on the frequency dimension to make the frequency feature more obvious, and then the new feature is sent to the CNN for deep learning and identification. An extraction and accumulation process of the frequency feature of the spectrogram is shown in FIG. 17 below. An architecture of the adopted CNN is shown in FIG. 21 below. A newly-collected audio signal is sent to the target identification module. The target identification module classifies and identifies the audio signal by using the trained network model, and outputs an identification result. An output interface of the target identification module is shown in FIG. 22 below. A left side of the interface displays original probabilities of various classifications, and a right side displays the spectrogram and gives a final classification result.

What is claimed is:

1. A harmonic radar based on a field programmable gate array (FPGA) and deep learning, comprising: a signal processing module, a radio frequency (RF) transmitter, a transceiver antenna, a second-harmonic receiver, a third-harmonic receiver, an RF power supply, a user display module, and a target identification module, wherein
the signal processing module is connected to the RF transmitter by using a pin structure, and the RF transmitter is connected to the transceiver antenna by using an RF cable structure; and the signal processing module is connected to the second-harmonic receiver, the third-harmonic receiver, the user display module, and the target identification module by using the RF cable structure;

as a core of the signal processing module, the FPGA generates a baseband linear frequency modulation (LFM) signal in a transmitting direction, converts the baseband LFM signal into an analog signal by using a digital-to-analog converter (DAC) of the RF transmitter, mixes the analog signal with a local carrier frequency signal to obtain an RF transmitting signal through modulation, filters a high-frequency component and an interference signal from the RF transmitting signal by using a filter, sends the RF transmitting signal to a power amplifier to adjust transmitting power, filters a leaked high-frequency component by using the filter, and transmits the RF transmitting signal by using the transceiver antenna;

the baseband LFM signal $S_{LMF\_train}(t)$ is expressed as follows:

$$S_{LMF\_train}(t) = A \cdot \sum_{i=0}^{N-1} rect\left(\frac{t_i}{T_p}\right) e^{j2\pi(f_c t_i + \gamma t_i^2/2)} \quad iT - \frac{T_p}{2} \le t_i \le iT + \frac{T_p}{2}$$

wherein A represents a pulse amplitude, N represents a quantity of pulses in a single group, rect(·) represents a rectangular pulse, $$rect(u) = \begin{cases} 1, & |u| \le 1/2 \\ 0, & others \end{cases}, t_i$$

represents fast time, $T_P$ represents a pulse width, $f_c$ represents a radar center frequency, and $\gamma = B/T_p$ represents a frequency modulation (FM) slope of the LFM signal, wherein B represents a sweep bandwidth of the LFM signal, and T represents a pulse repetition interval;

a second-harmonic signal and a third-harmonic signal are generated after the RF transmitting signal irradiates a target, and are transmitted to the second-harmonic receiver and the third-harmonic receiver respectively; after undergoing low-noise amplification and filtering by the corresponding harmonic receiver, the second-harmonic signal and a corresponding local oscillator signal are demodulated by an I/Q demodulator to obtain an echo baseband signal, and the third-harmonic signal and a corresponding local oscillator signal are demodulated by the I/Q demodulator to obtain an echo baseband signal; and then each of the echo baseband signal is amplified by an intermediate frequency (IF) amplifier and converted into a differential form, and then sent to the signal processing module for processing and analysis after being quantified and converted by an analog-to-digital converter (ADC);

each of the echo baseband signal $s_r(t)$ is expressed as follows:

$$s_r(t) = s_t\left(t - \frac{2R_t}{c}\right)$$

wherein $R_t$ represents a distance of a single scattering point target relative to a radar, c represents a light speed, and $s_t(t)$ represents a transmitting signal formed by a coherent pulse train, which is expressed as follows:

$$s_t(t) = \sum_{n=0}^{N-1} s_{LMF\_train}(t - nT_r)$$

wherein $T_r$ represents a pulse repetition cycle; the differential form of the converted echo baseband signal is as follows:

$$s_{r-}(t) = k_{11} s_r(t) + k_{12} s_{ref}$$

$$s_{r+}(t) = k_{21} s_{r-}(t) + k_{22} s_{ref}$$

wherein $k_1$, $k_{12}$, $k_{21}$, and $k_{22}$ represent fixed conversion coefficients, and $s_{ref}$ represents a fixed reference signal; the signal processing module performs pulse compression, pulse accumulation, and identification and detection on signals input by the second-harmonic receiver and the third-harmonic receiver, and inputs processed signals to the user display module for spectrum display; and converts another signal into an audio signal, inputs the audio signal to the target identification module for identification and classification, and displays an identification result;

a two-dimensional signal $s_{accum}(\hat{t}, f_k)$ in a range-doppler domain displayed in an output spectrum is expressed as follows:

$$S_{accum}(\hat{t}, k) = \sum_{n=0}^{N-1} \exp\left[j\left(\omega_d T_r - \frac{2\pi}{N}k\right)n\right]$$

$$= \frac{\sin\left[N\pi\left(f_d - \frac{k}{NT_r}\right)T_r\right]}{\sin\left[\pi\left(f_d - \frac{k}{NT_r}\right)T_r\right]} \exp\left[j\pi(N-1)\left(f_d - \frac{k}{NT_r}\right)T_r\right],$$

$$k = 0, 1, \ldots, N-1$$

wherein $\hat{t}$ represents fast time, indicating time within each pulse relative to start time of a synchronization cycle of the pulse; and $\omega_d = 2\pi f_d$, and $f_d$ represents a Doppler frequency caused by motion of the target; and it is set that $$f_k = \frac{k}{NT_r},$$

which is substituted into the above formula to obtain an amplitude-frequency response of an accumulated signal in a Doppler domain:

$$|S_{accum}(\hat{t}, f_k)| = \left|\frac{\sin[N\pi(f_k - f_d)T_r]}{\sin[\pi(f_k - f_d)T_r]}\right|.$$

2. The harmonic radar based on the FPGA and deep learning according to claim 1, wherein the signal processing module further comprises a clock source, a fan-out device, a differential amplification circuit, an audio codec module, a network interface module, and a power module.

3. The harmonic radar based on the FPGA and deep learning according to claim 1, wherein a hardware circuit of the FPGA comprises the FPGA, a Flash configuration circuit, a clock and reset circuit, and a user interface, wherein the user interface comprises a DAC bus, an ADC bus, a screen, and a key; and the FPGA is responsible for timing control, data access, user interactive display of a peripheral device, baseband transmitting signal generation, pulse compression, pulse accumulation, and identification and detection of each of the echo baseband signal.

4. The harmonic radar based on the FPGA and deep learning according to claim 1, wherein the RF transmitter comprises a local oscillator, an I/Q modulator, the power amplifier, and a cascaded filtering circuit; and the local oscillator generates the local carrier frequency signal, the I/Q modulator modulates the baseband LFM signal and the local carrier frequency signal to obtain the RF transmitting signal; and the RF transmitting signal is sent to the power amplifier to adjust the transmitting power after the high-frequency component leaked between channels and the interference signal generated by a device nonlinearly are filtered from the RF transmitting signal by using a band-pass filter, and radiated by a transmitting antenna after the leaked high-frequency component is further filtered by the cascaded filtering circuit.

5. The harmonic radar based on the FPGA and deep learning according to claim 1, wherein the transceiver antenna is configured to transmit a wireless signal and receive second and third harmonics of the target, and specifically-comprises a broadband spiral antenna, a four-port broadband circulator for harmonic suppression, and a miniaturized band-pass filter for suppressing a higher harmonic.

6. The harmonic radar based on the FPGA and deep learning according to claim 1, wherein the second-harmonic receiver and the third-harmonic receiver each comprises an RF amplification circuit and a demodulation circuit; and the second-harmonic signal and the third-harmonic signal radiated by a nonlinear target and received by the transceiver antenna is amplified, each of the echo baseband signal is obtained by demodulating an amplified echo and the local oscillator signal by the I/Q demodulator, each of the echo baseband signal is amplified by using the IF amplifier, and the amplified each of echo baseband signal is sent to a signal processing unit for processing and analysis after being converted by the ADC.

7. The harmonic radar based on the FPGA and deep learning according to claim 1, wherein the target identification module comprises a data collection terminal, a data pre-processing module, an artificial neural network (ANN) model, an artificial interaction module, and an encapsulation module, wherein a deep learning technology is used to build an ANN, and an accumulation method based on a frequency-domain feature is used to learn a feature of an audio signal database collected by the harmonic radar, generate a classification model, establish an artificial intelligent classification system, and complete classification and identification of a harmonic radar target; and the data collection terminal is connected to output ports of the second-harmonic receiver and the third-harmonic receiver; the data pre-processing module performs batch processing, clipping, and alignment operations on training set data and test set data; the ANN model is responsible for extracting a feature from the training set data, performing deep learning and training, and completing model encapsulation under an optimal parameter configuration; and the artificial interaction module is responsible for displaying an atlas feature of to-be-identified data, calling the encapsulated model, performing feature identification, completing target classification, and displaying an obtained target classification and identification result.

8. The harmonic radar based on the FPGA and deep learning according to claim 7, wherein types of the harmonic radar target comprise a semiconductor, a metallic contact, a wall-mounted switch, wall-mounted socket, a network port, a mouse, an integrated circuit board, a lithium battery, a power adapter, a professional recording device, a secure digital (SD) storage card, and a micro microphone.

9. The harmonic radar based on the FPGA and deep learning according to claim 1, wherein the signal processing module further performs audio conversion comprising amplitude modulation (AM) audio conversion and FM audio conversion, and wherein:

1) a process of converting harmonic power $Y_{HR2}(t)$ obtained by sketching the second harmonic into an AM audio signal is as follows:

setting a sinusoidal carrier of the AM audio signal of the second harmonic as follows: $c_2(t)=A_2 \cos(\omega_{c2}t+\phi_0)$ wherein $A_2$ represents a carrier amplitude of the second harmonic; $\omega_{c2}$ represents a carrier angular frequency of the second harmonic; and $\phi_0$ represents an initial phase of the carrier; and expressing, based on a definition of modulation, an AM signal of the second harmonic as follows: $s_{AM2}(t)=A_2 Y_{HR2}(t)\cos(\omega_{c2}t)$ 2) a process of converting harmonic power $Y_{HR3}(t)$ obtained by sketching the third harmonic into an AM audio signal is as follows:

setting a sinusoidal carrier of the AM audio signal of the third harmonic as follows: $c_3(t)=A_3 \cos(\omega_{c3}t+\phi_0)$ wherein $A_3$ represents a carrier amplitude of the third harmonic; and $\omega_{c3}$ represents a carrier angular frequency of the third harmonic; and expressing, based on the definition of modulation, an AM signal of the third harmonic as follows: $s_{AM3}(t)=A_3 Y_{HR3}(t)\cos(\omega_{c3}t)$ 3) a process of converting the harmonic power $Y_{HR2}(t)$ obtained by sketching the second harmonic into an FM audio signal is as follows:

setting a sinusoidal carrier of the FM audio signal of the second harmonic as follows: $c_2(t)=A_2 \cos(2\pi f_{c2}t)$ wherein $f_{c2}$ represents the carrier frequency of the second harmonic; and expressing an FM signal of the second harmonic as follows:

$$s_{FM2}(t) = A_2\cos\left[2\pi f_{c2}t + K_{f2}\int_{-\infty}^{+\infty} Y_{HR2}(\tau)d\tau\right]$$

wherein $K_{f2}$ represents FM sensitivity of the second harmonic, and $$K_{f2}\int_{-\infty}^{+\infty} Y_{HR2}(\tau)d\tau$$

is a phase offset of the second harmonic; and 4) a process of converting the harmonic power $Y_{HR3}(t)$ obtained by sketching the third harmonic into an FM audio signal is as follows:

setting a sinusoidal carrier of the FM audio signal of the third harmonic as follows: $c_3(t) = A_3 \cos(2\pi f_{c3} t)$ wherein $f_{c3}$ represents a carrier frequency of the third harmonic; and expressing an FM signal of the third harmonic as follows:

$$s_{FM3}(t) = A_3 \cos\left[ 2\pi f_{c3} t + K_{f3} \int_{-\infty}^{+\infty} Y_{HR3}(\tau) d\tau \right]$$

wherein $K_{f3}$ represents FM sensitivity, and $$K_{f3} \int_{-\infty}^{+\infty} Y_{HR3}(\tau) d\tau$$

is a phase offset of the third harmonic.

10. The harmonic radar based on the FPGA and deep learning according to claim 1, wherein the audio signal is identified and classified by accumulating an audio data feature collected by the harmonic radar based on a frequency dimension of a spectrogram, and then sending an accumulated new feature to a convolutional neural network (CNN) for deep learning.

* * * * *